United States Patent [19]
McCutcheon et al.

[11] Patent Number: 5,691,037
[45] Date of Patent: Nov. 25, 1997

[54] DAMPED LAMINATES WITH IMPROVED FASTENER FORCE RETENTION, A METHOD OF MAKING, AND NOVEL TOOLS USEFUL IN MAKING

[75] Inventors: Jeffrey W. McCutcheon; Donald T. Landin, both of Eagan, Minn.

[73] Assignee: Minnesota Mining and Manufacturing Company, St. Paul, Minn.

[21] Appl. No.: 674,935

[22] Filed: Jul. 3, 1996

Related U.S. Application Data

[63] Continuation of Ser. No. 372,337, Jan. 13, 1995, abandoned.

[51] Int. Cl.$^6$ ................................. F16F 15/12; B32B 3/28
[52] U.S. Cl. .................... 428/172; 428/137; 428/457; 428/68; 428/71; 428/75; 428/220; 428/323; 428/201; 428/99; 428/913; 52/403.1; 267/292; 267/141; 248/636; 248/638; 181/207; 181/208
[58] Field of Search ...................... 428/137, 172, 428/457, 68, 71, 75, 220, 323, 201, 99, 913; 181/207, 208; 52/403.1; 267/292, 141; 248/636, 638

[56] References Cited

U.S. PATENT DOCUMENTS

| | | | |
|---|---|---|---|
| 2,355,568 | 8/1944 | Smith | 181/208 |
| 2,819,032 | 1/1958 | Detrie et al. | 244/119 |
| 3,071,217 | 1/1963 | Gould | 189/34 |
| 3,078,969 | 2/1963 | Campbell et al. | 189/37 |
| 3,159,249 | 12/1964 | Lazan | 189/34 |
| 3,160,549 | 12/1964 | Caldwell et al. | 161/161 |
| 3,456,939 | 7/1969 | Duchemin | 267/47 |
| 3,475,213 | 10/1969 | Stow | 117/227 |
| 3,489,242 | 1/1970 | Gladding et al. | 181/208 |
| 3,605,953 | 9/1971 | Caldwell et al. | 181/1 |
| 3,762,946 | 10/1973 | Stow et al. | 117/227 |
| 4,048,366 | 9/1977 | Kingsbury | 428/215 |
| 4,195,713 | 4/1980 | Hagbjer et al. | 181/208 |
| 4,223,073 | 9/1980 | Caldwell et al. | 428/422 |
| 4,278,726 | 7/1981 | Wieme | 428/229 |
| 4,463,049 | 7/1984 | Kradre | 428/281 |
| 4,548,862 | 10/1985 | Hartman | 428/323 |

(List continued on next page.)

FOREIGN PATENT DOCUMENTS

| | | |
|---|---|---|
| 0 167 455 | 1/1986 | European Pat. Off. . |
| 0 466 513 | 1/1992 | European Pat. Off. . |
| 0 507 515 A2 | 10/1992 | European Pat. Off. . |
| 0 566 093 A1 | 10/1993 | European Pat. Off. . |

(List continued on next page.)

OTHER PUBLICATIONS

Partial International Search Report dated Apr. 4, 1996 from corresponding International Application No. PCT/US95/16271 (3 pages).

G.W. Dexter, *Hardening high speed steels: metallurgical benefits of salt in Heat Treating* (3 pages) Aug. 1989; Reprinted by Precision Punch Corporation, New Britain, Connecticut.

(List continued on next page.)

*Primary Examiner*—William Watkins
*Attorney, Agent, or Firm*—Gary L. Griswold; Walter N. Kirn; Janice L. Dowdall

[57] ABSTRACT

The present invention relates to a vibration damped laminate articles having improved force (torque and/or pressure and/or stress) retention, a method of making one article type and novel tools used to make the one article type. The first laminate comprises at least one layer of damping material between at least two substrate layers. At least one deformation area is present in the laminate wherein the substrate(s) are plastically deformed such that they are closer than non-deformed areas of the substrate and wherein the damping material has less mass than in a non-deformed area of the article; the deformation areas providing the areas of good force retention, for an attachment device attached thereto. The second laminate, which is not deformed, contains an additive of sufficient modulus, diameter and loading, in a vibration damping layer to provide improved force retention.

42 Claims, 11 Drawing Sheets

U.S. PATENT DOCUMENTS

| | | | |
|---|---|---|---|
| 4,606,962 | 8/1986 | Reylek et al. | 428/148 |
| 4,663,224 | 5/1987 | Tabata et al. | 181/208 |
| 4,678,707 | 7/1987 | Shinozaki et al. | 428/323 |
| 4,681,816 | 7/1987 | Hashimote et al. | 428/463 |
| 4,716,986 | 1/1988 | Umemoto et al. | 181/207 |
| 4,722,960 | 2/1988 | Dunn et al. | 524/430 |
| 4,859,523 | 8/1989 | Endoh et al. | 428/215 |
| 4,923,034 | 5/1990 | Okuzawa et al. | 181/207 |
| 4,982,300 | 1/1991 | Forbord | 360/106 |
| 5,086,088 | 2/1992 | Kitano et al. | 522/170 |
| 5,143,790 | 9/1992 | Stattinger | 428/457 |
| 5,183,863 | 2/1993 | Nakamura et al. | 525/143 |
| 5,203,435 | 4/1993 | Dolgin | 188/322.3 |
| 5,214,549 | 5/1993 | Baker et al. | 360/97.02 |
| 5,240,221 | 8/1993 | Thomasen | 248/559 |
| 5,256,223 | 10/1993 | Alberts et al. | 156/71 |
| 5,258,972 | 11/1993 | Brasfield et al. | 369/270 |
| 5,260,367 | 11/1993 | Toda et al. | 524/449 |
| 5,260,522 | 11/1993 | Vogt et al. | 181/207 |
| 5,262,232 | 11/1993 | Wilfong et al. | 428/327 |
| 5,308,887 | 5/1994 | Ko et al. | 522/148 |
| 5,552,209 | 9/1996 | McCutcheon | 428/209 |

FOREIGN PATENT DOCUMENTS

| | | |
|---|---|---|
| 0 757 938 A2 | 2/1997 | European Pat. Off. ........ B32B 15/08 |
| 2382622 | 9/1978 | France . |
| 2447477 | 8/1980 | France . |
| 8 701 188 | 12/1988 | Netherlands . |

OTHER PUBLICATIONS

PCX–1 Polycore Composites Physical Properties Sheet, PreFinish Metals, Inc., Polycore Composites, Elk Grove Village, Illinois, undated.

*The Handbook of Metal Forming,* Kurt Lange, Editor, (McGraw–Hill Book Company), 1985 ISBN 0–07–036285–8 (Preface, Table of Contents and ISBN number only).

PCX–9 Polycore Composites Physical Properties Sheet, PreFinish Metals, Inc., Polycore Composites, Elk Grove Village, Illinois, undated.

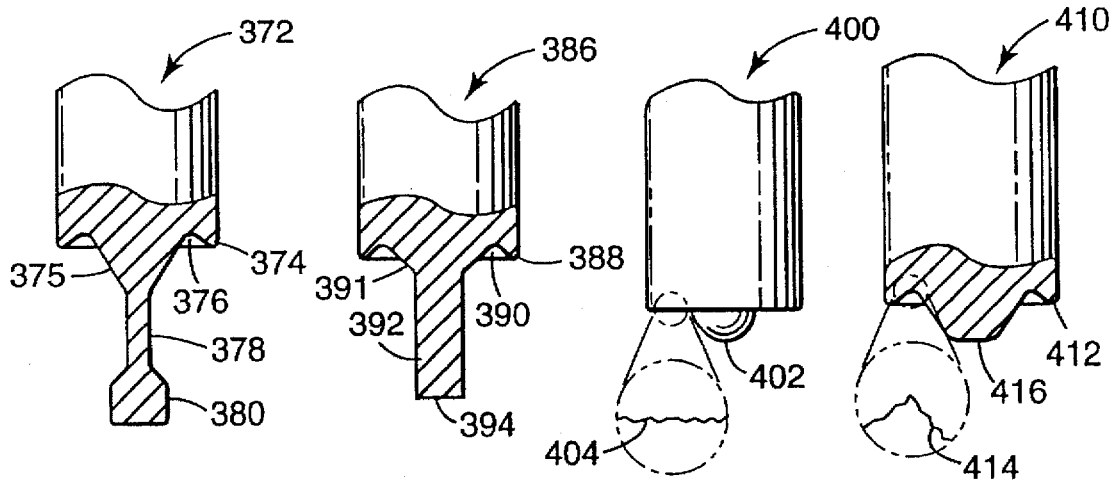
*Fig. 29*    *Fig. 30*    *Fig. 31*    *Fig. 32*
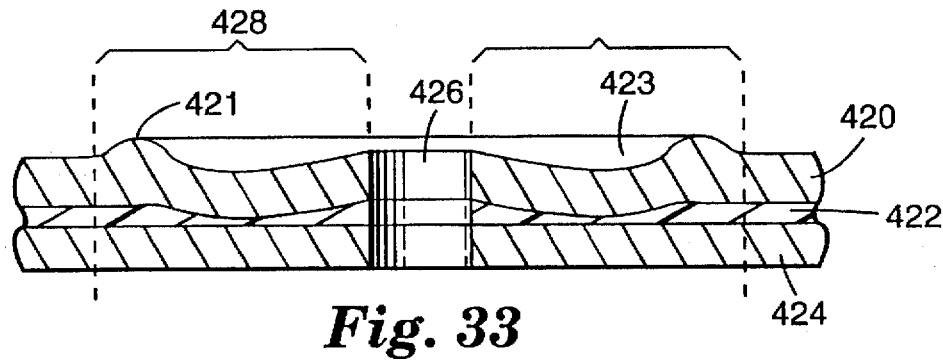
*Fig. 33*
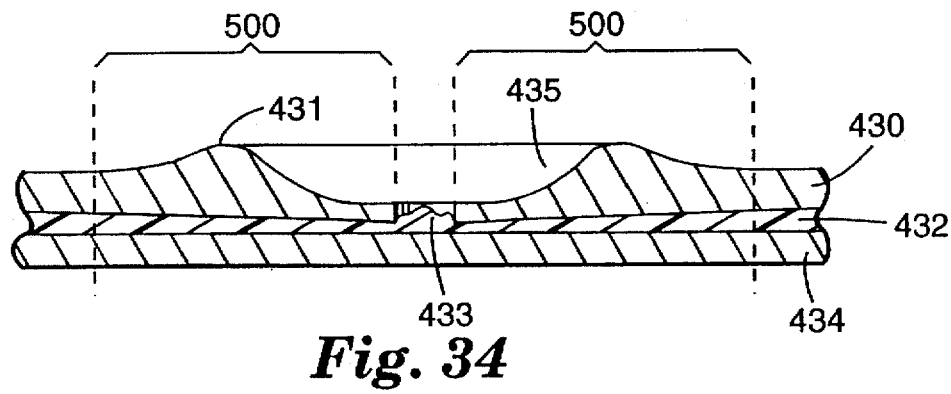
*Fig. 34*
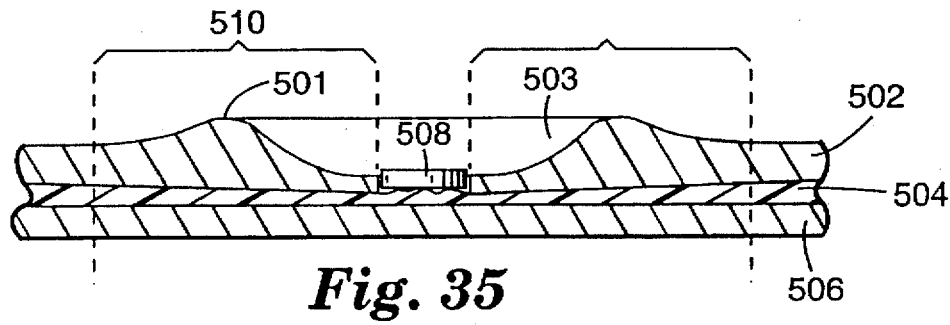
*Fig. 35*

DAMPED LAMINATES WITH IMPROVED FASTENER FORCE RETENTION, A METHOD OF MAKING, AND NOVEL TOOLS USEFUL IN MAKING

This is a continuation of application Ser. No. 08/372,337, filed Jan. 13, 1995, abandoned.

FIELD OF THE INVENTION

The present invention relates to a vibration damped laminate article having improved force (torque and/or pressure and/or stress) retention, a method of making the article, a fastening assembly, and novel tools which can be used to make the articles. An attachment device, such as a screw, that provides a mechanical force to hold the laminate article of the invention in a location has improved torque and/or pressure and/or force retention compared to systems using known laminates. The present invention also relates to a method of improving the force retention properties of a damped laminate article by permanent displacement of at least a portion of the vibration damping material in an intended attachment location from an initial location which in turn reduces the force lost following attachment of the laminate with an attachment device (such as a screw, bolt, etc.).

BACKGROUND OF THE INVENTION

Periodic or random vibrations or shocks can excite the resonant frequencies in various structures, such as disk drive covers, disk drive bases, automobile oil pans, valve covers, etc. which can be problematic due to the resultant formation of undesirable stresses, displacements, fatigue, and even sound radiation or high levels of sound transmission. In addition, these various components (disk drive covers, automobile valve covers, etc.) may also be used as part of an enclosure to prevent acoustical noise from transmitting through the enclosure and are designed to reduce the level of noise passing through. Such undesirable vibrations, shocks or noise sources are typically induced by external or internal forces or noise generators and can be experienced by a wide variety of articles and under a variety of conditions. For example, resonant vibrations can cause significant levels of acoustical noise in a disk drive assembly. This noise can be easily transmittable through a typical monolithic material cover or base casting of the disk drive allowing excessive noise to pass through the material which is undesirable to the operator of the disk drive. The resonant vibrations in the cover or base may also lead to excessive vertical or horizontal displacement of the key mechanical attachment points in the disk drive leading to poor overall disk drive performance and even potential reliability problems. Control of the resonant vibrations and shock in a disk drive are key to optimum performance in the read/write process and quiet operation plus high disk drive reliability.

Various techniques have been used to reduce resonant vibrational and shock effects (stresses, displacements, noise, etc.) on articles such as disk drive storage articles and other designs requiring control of resonant vibrations and noise generation or transmission. Three basic techniques to reduce vibration and shock effects, plus noise control in the basic design of a structure include: 1) adding stiffness or mass to the article so that the resonant frequencies of the article are not excited by a given excitation source. Noise transmission may also be reduced with the added mass or stiffness; 2) isolating the article from the excitation so the vibrational or shock energy does not excite the article's resonant frequencies; and 3) damping the article so that given excitations do not result in excessive negative effects at the resonant frequencies of the article and that noise cannot easily transmit through the article.

Option 1) above may not be desirable as the added mass or stiffness can add significant weight or volume to a design. Added mass is not desirable for weight sensitive applications (automobiles, disk drives, planes, etc.) and added stiffness can add cost and/or thickness to an article, which may be undesirable. Isolating the article as in option 2) may not be desirable from a design, cost, weight, etc. standpoint.

The preferred known method to reduce resonant vibrations, shock effects and noise transmission or generation is by using viscoelastic damping materials in a design. The viscoelastic damping materials will dissipate the vibrational energy generated by the resonant vibrations thus reducing the negative effects of the excitation source. The viscoelastic materials when used in a design can also reduce the transmitted or generated noise in an article. The viscoelastic materials can be used as an add-on item to the article or more optimally as an inner layer of a laminate structure used to make the article.

Patents that describe damping and isolation methods to control the resonant vibrations in various articles to reduce noise generation, noise transmission, mechanical displacements, etc. (such as automobiles oil pans, valve covers, laminated panels, disk drive covers, etc.) include U.S. Pat. No. 5,258,972 "Magnetic Damping Disc for Improved CD Hayer Performance", issued Nov. 2, 1993 (Brasfield et al.) and U.S. Pat. No. 4,223,073 "High Temperature Damping Composite" issued Sep. 16, 1980 (Caldwell et. al.).

Two types of surface or external damping treatments which can be used to reduce shock or vibration impact on various articles are (1) free layer damping treatments; and (2) constrained layer damping treatments. Both of these damping treatments can provide high levels of damping to a structure, i.e., dissipation of undesirable vibrations, without sacrificing the stiffness of the structure. The use of viscoelastic materials as exterior surface damping treatments is described in EP 0507515 published Oct. 7, 1992. Examples of additional surface or external damping techniques are described, for example, in U.S. Pat. Nos. 2,819,032 (issued Jan. 7, 1953); 3,071,217 (issued Jan. 1, 1963); 3,078,969 (issued Feb. 26, 1963); 3,159,249 (issued Dec. 1, 1964); and 3,160,549 (issued Dec. 8, 1964). These patents describe methods of attachments of dampers to a surface. A more preferred configuration includes an inner and outer layer of high modulus material (substrate layers) and an inner layer (s) of a viscoelastic material. The use of this configuration can simplify the manufacturing process and design, but also adds the potential for problems in attachment of the "viscoelastic laminate article" to various bases, housings, or other structures. Patents that describe this technique include: U.S. Pat. Nos. 4,678,707 (issued Jul. 7, 1987); 4,681,816 (issued Jul. 21, 1987); and 4,048,366 (issued Sep. 13, 1977).

Constrained layer damping treatments or viscoelastic laminate damping is also referred to as "shear damping" treatments. In this technique, damping occurs by applying a damper consisting of one or more layers of viscoelastic damping material and one or more layers of a higher tensile modulus material (substrate) to one or more exterior surfaces of the article to be damped or by combining the layers of higher modulus material (substrate) and viscoelastic damping materials in a "sandwich construction" or "laminate" from which the end article is made from. Energy dissipates from the viscoelastic damping material via a shear strain mechanism. The shear strain results from constraints by the higher modulus constraining layer and the base structure or between the layers of the laminated damping structure. Both constrained layer damping treatments and viscoelastic laminate damping techniques can be used for identical applications. The viscoelastic laminate is advantageous over the constrained layer add-on treatment in that it reduces the overall parts count in an assembly thus reducing potential manufacturing costs while providing the possibility of a more optimum damping design. One of the largest uses of viscoelastic laminates is in the automobile industry for oil pans, valve covers, and other viscoelastic laminate formed parts or panels. The laminates in this application offer significant reductions in the acoustical noise transmission and generation escaping from the engine and also reduce the acoustical noise that can enter the passenger compartment in addition to reducing the resonant frequency amplitudes in the articles. These laminates typically have an attachment area by which the laminate part is attached to a base, housing or other structure. The method of attachment of the laminates could be by screws, bolts, nails, rivets, clamps, or other mechanical attachment devices.

One potential problematic area in using the viscoelastic laminates is in the attachment of the laminates. The viscoelastic damping material will stress relax following attachment of the laminate(s) to the structure or base using the screws, bolts, nails, rivets, clamps or other mechanical attachment devices. The attachment devices are used to securely hold the laminates in a specific alignment and under a specific stress or pressure or torque or fastening force. The torque, pressure, stress, or fastening force will tend to relax somewhat normally even in non-laminate structures due to stress relaxation in the fastener material, substrate material, or fastener attachment point to the structure. Thus, in a laminated article, stress relaxation occurs in the fastening system, the laminate, and also to a smaller degree the higher modulus layers of the laminate. The dominate area of stress relaxation is typically the viscoelastic material part of the laminate. Furthermore, variations in temperature above the application temperature of the laminate using the attachments devices can allow the attachment system to stress relax in a shorter period of time.

The stress, torque, pressure, or fastening force in the attachment device prevents the attachment device from loosening during use of the structure the laminate is attached to. If the attachment device is allowed to fall below a critical attachment force, the laminate could become loose allowing the laminate to shift from the desired location. The loose laminate could interfere with other items near it and/or induce misalignment in items attached to the laminate. Furthermore, the fastener devices could loosen to the point where they would no longer support the laminate in a proper alignment leading to a catastrophic failure of the unit to which the laminate is attached.

Methods that have been used to prevent failure of the attachment of the laminate due to the stress relaxation in the viscoelastic layer are discussed below. Each method has shortfalls that can add cost, processing time, design complexity, etc. or combinations of each that are not desirable. Operations or designs to reduce the viscoelastic layers stress relaxation after application of the fastener device include those which are disclosed in PCX-9POLYCORE COMPOSITES® Physical Properties Sheet, Pre Finish Metals Inc., Polycore Composites®, Elk Grove Village, Ill., such as:

1) The use of an automatic Bolt Torque equipment should allow for the entire laminate construction. This fastener attachment method provides for an increased attachment force (torque or pressure) (as compared to a non-laminate material) via the attachment device to the laminate in the attachment area such that after the damping material layer stress relaxes the minimum force required for the application is maintained. This added application force to the attachment device to achieve an initial force value high enough to not stress relax below the minimum specification requires an attachment device that can support the added force used on it without mechanical failure. For example, in a disk drive cover application, aluminum screws may be used to attach a laminate cover to a base. The base casting has holes prepared to accept the screws. The screws and screw heads are designed for low cost and a monolithic cover (i.e. no torque loss in the screw attachment device due to stress relaxation in the damping material). The increased torque required initially when attaching the cover to achieve the minimum torque in the screw following stress relaxation can exceed the strength of the screw head-shaft interface, the screw head features (Phillips, Torx, slotted, etc.) that the driver uses to engage the screw and through which the force is applied. In addition, the screw hole tapping or screw features can be stripped in the base or combinations thereof.

To allow for added torque to the fastening system without failure, a stronger screw must be used (such as a stainless steel screw) or a stronger tapped hole for the screw in the base the screws fit into. This added torque requirement in the screw (or attachment device) can significantly increase the screw cost or the tapped hole cost, plus add cost to the screw attachment equipment to ensure a tightly controlled attachment process.

2) Another method involves use of a thin input viscoelastic layer in the construction of the laminate to lessen the amount the viscoelastic layer can stress relax. (PCX-9 discloses a layer which is only 0.0254 mm (0.001") thick.) This approach is undesirable as the optimum design of the laminate viscoelastic thickness to reduce resonant vibrations (and reduce acoustical noise generated or transmission) may not be the optimum for the viscoelastic layer thickness in regard to force retention after viscoelastic relaxation. In addition, in applications where the laminate material is formed into a specific shape (drawn, embossed, etc.), a too thin viscoelastic layer could reduce the performance of the laminate in regard to its ability to be drawn to a specific depth or length without delamination of the viscoelastic layer occurring.

3) Another method involves retorquing or applying a secondary (or more) re-application of attachment force once the viscoelastic layer has stress relaxed to achieve the desired attachment force. This method is disadvantageous in that it adds cost to the attachment process and is not acceptable in most applications, especially high volume applications where added work in process or secondary operations can significantly increase manufacturing costs. The time to manufacture an assembly using a laminate could also increase significantly if the "time to stress relax" is long. In addition, process steps following the attachment of the laminate to another item or other components added to the assembly the laminate is a part of, or to the laminate, could prevent the re-torquing of the attachment devices if they are hidden or covered or too near other components when installed. The retorquing could also alter alignment of the laminate slightly which in some applications may be undesirable if other processes are completed that were based on the laminate's initial location.

4) Another method involves the application of heat to the laminate during the attachment device application process.

The heat will reduce the modulus of the viscoelastic layer thus making the viscoelastic layer softer and may be easier to compress. When the force of the fastener device is installed, the viscoelastic layer will tend to stress relax during application of the fastener device and not over a longer period of time. If the temperature is high enough, a significant portion of the stress relaxation in the viscoelastic layer may occur during the fastener device application. This method to reduce stress relaxation is disadvantageous in that the use of heat during the laminate article attachment is often not practical for a manufacturing process as it will add cost, application complexity, safety concerns if the temperature required is high, and difficulty in monitoring the process. In addition, components, fluids or electronics near the laminate may not allow for the use of heat in the application of the laminate.

5) Another method involves compression of the viscoelastic layer around the area to be torqued during stamping of the laminate. This method of compression may not provide adequate torque retention in all applications. Although simple compression of a viscoelastic damping material may provide some force retention improvement, optimum force retention will not be achieved, especially in applications where only low torque and/or force and/or pressure can be applied in attachment of the fastener device.

Thus, in applications where the above methods are not acceptable, a new method is required to attach the laminate and still achieve acceptable force retention characteristics.

SUMMARY OF THE INVENTION

We have found such an alternative approach. The present invention provides a damped laminate article having at least one intended attachment area on the laminate wherein the vibration damping material layer is less massive or nonexistent and one or more substrate layers are plastically deformed. Since the damping material is typically reduced or nonexistent only in the intended attachment area(s) this allows a laminate to be optimally designed for the application in terms of vibration damping material thickness for control of resonant vibration or shock and also noise generation or transmission, plus forming requirements the laminate that may need to meet. The attachment area(s) provide improved torque and/or stress and/or force and/or pressure retention in these attachment area(s) upon application to a second article which may be a base, housing, etc., with the attachment device. Since the vibration damping layer is less massive or nonexistent only in a very small area this does not affect the overall design or effectiveness of the viscoelastic damping laminate treatment.

The present invention provides a laminate article comprising:

a first substrate layer and a second substrate layer;

at least one layer of vibration damping material comprising a viscoelastic material positioned between said first and second substrate layers;

optionally one or more additional substrate layers positioned between said first and second substrate layers;

optionally 1 or more bonding material layers bonded between a substrate layer and a vibration damping layer, wherein the storage modulus of each bonding material layer is higher than the storage modulus of the viscoelastic material contained in a vibration damping layer to which it is bonded;

wherein the storage modulus of each substrate layer is greater than that of the viscoelastic material in any vibration damping material layer with which it is in contact;

wherein at least one deformation area is present in said article, wherein a deformation area is an area of the article wherein at least one substrate layer is plastically deformed such that at least two substrate layers are touching or positioned closer to each other than in an area of the article in which none of the substrates are plastically deformed, and wherein in at least 1 vibration damping material layer, within at least a 5% area of the deformation area, the vibration damping material is non-existent or, if present, has a mass that is 90% or less than the average mass of the vibration damping material layer of an equal area in an area of the article which is not in a deformation area.

The laminate article may optionally have one or more holes present in a substrate layer in a deformation area. The laminate article may have one or more through holes present in the article in a deformation area. A "through hole" as used herein refers to a hole that passes completely through the article.

The present invention also relates to a non-deformed laminate in the attachment area with improved force retention. This laminate article comprises:

a first substrate layer and a second substrate layer;

at least one layer of vibration damping material comprising a viscoelastic material positioned between said first and second substrate layers;

optionally one or more additional substrate layers positioned between said first and second substrate layers;

optionally 1 or more bonding material layers bonded between a substrate layer and a vibration damping layer, wherein the storage modulus of each bonding material layer is higher than the storage modulus of the viscoelastic material contained in a vibration damping layer to which it is bonded;

wherein the storage modulus of each substrate layer is greater than that of the viscoelastic material in any vibration damping material layer with which it is in contact;

wherein at least one vibration damping material layer further comprises an additive selected from the group consisting of fibers, particulates, fillers and mixtures thereof;

wherein the total amount of additive is about 1 to about 95 weight percent based upon the total weight of the vibration damping material;

wherein the particulate size ranges from about 10 to about 125% of the average thickness of the vibration damping material layer in which the particulate is present;

wherein the fiber diameter ranges from about 10 to about 125% of the average thickness of the vibration damping layer in which the fiber is present;

wherein the load bearing capacity of the additive is at least about 100 psi.

The invention also relates to the method by which the laminate articles of the invention are made. The present invention provides a method of improving the stress and/or torque and/or force and/or pressure retention of a damped laminate article by permanent displacement of at least a portion of the vibration damping material(s) and plastic deformation of the substrate(s) in the intended deformation area(s).

The present invention provides a method of preparing a laminate article comprising the steps of:

(a) preparing a laminate comprising at least one layer of vibration damping material comprising a viscoelastic material positioned between a first substrate layer and a second substrate layer, and optionally one or more additional substrate layers positioned between said first and second substrate layers wherein each substrate layer has a higher storage modulus than the storage modulus of the viscoelastic material contained in a vibration damping material layer with which it is in contact, optionally 1 or more bonding material layers can be bonded between a substrate layer and a vibration damping layer, wherein the storage modulus of each bonding material layer is higher than the storage modulus of the viscoelastic material contained in a vibration damping layer to which it is bonded;

(b) forming at least one deformation area in the laminate article by impinging a punch tool against at least one area of at least one substrate layer selected from the group consisting of said first and second substrate layers to plastically deform one or more substrate layers, such that at least two substrate layers are touching or positioned closer to each other than in an area of the article in which none of the substrate layers are plastically deformed, wherein within at least 1 vibration damping layer, within at least a 5% area of the deformation area, the vibration damping material is non-existent or, if present, has a mass that is about 90% or less than the average mass of the same vibration damping material layer in an equal area of the article which is not a deformation area.

In addition the deformation of the substrate(s) can reduce the contact area between the attachment device (e.g., the head of a screw etc.,) and the laminate surface. The smaller surface area of contact will equate to an overall lower dynamic friction between the screw head and laminate substrate surface during the torquing operation thereby allowing effectively more force to be applied in torquing the screw into place for a given torque applied to the head of the screw (i.e., more force available to overcome the friction in the screw threads and the threaded/tapped hole).

The invention also relates to novel tools used to making the articles of the invention. The present invention provides a punch tool comprising a shaft having an end, wherein said end comprises (i) at least one protrusion; and (ii) at least one gripping feature. The gripping features are preferably selected from the group consisting of textured surfaces, continuous ridges, discontinuous ridges, continuous ridges having textured surfaces, and discontinuous ridges having textured surfaces.

BRIEF DESCRIPTION OF THE DRAWINGS

FIG. 29–30 are side views of different embodiment of punches with an extension added to the protrusion.

FIG. 31 is a partial cross-section of a punch.

FIG. 32 is a partial cross-section of a punch.

FIG. 33 is a partial cross-section of the top of the disk drive showing the fastening area.

FIG. 34 is a partial cross-section of the top of the disk drive showing the fastening area.

FIG. 35 is a partial cross-section of the top of the disk drive showing the fastening area.

DEFINITION OF TERMS

Figure 1:
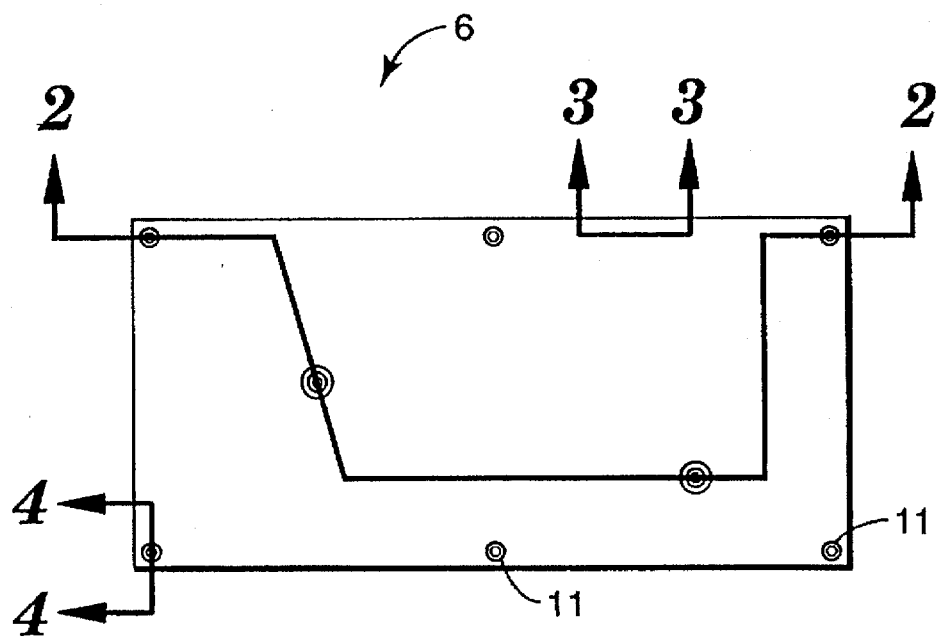
FIG. 1 is a top view of a disk drive, showing the disk drive cover.

The term "attachment device" as used herein refers to items such as screws, bolts, clamps, nails, rivets, clamps, integrally molded attachment devices, and other mechanical attachment devices that can hold the laminate in a desired location, position, attitude or configuration with a desired level of stress and/or torque and/or pressure and/or force.

The term "attachment area" as used herein describes the area in which an attachment device may contact the laminate and impart the force that is used to hold the laminate in a position, location, attitude, or configuration.

An example of an "attachment area" would be the area under the head of a screw, for example; the "attachment area" being defined to extend through the entire laminate.

The term "deformation area" as used herein describes a section of the article in which at least one substrate layer has been plastically deformed. The deformation area includes any article layer areas above and below the plastically deformed substrate areas. The deformation area is defined such that it does not include through hole areas. Furthermore, the deformation area does not include areas above or below a hole, which is not a through hole, in the article. For example, if the upper substrate layer contains a hole, the vibration damping layer beneath the area of the hole and the lower substrate layer in the area beneath the hole are both not considered to be part of the deformation area.

The attachment area can be the same, larger or smaller than the deformation area. The deformation area is generally designed to be as small as required to meet the needs of the attachment device so as to have a minimal impact on the performance of the laminate article in terms of resonant vibration control and noise generation or transmission.

The term "residual spring effect" and "residual spring force" are used interchangeably herein to refer to the spring type potential resistive force that exist between 2 or more substrate layers of a laminate that have a separation between them. This separation will require the attachment force of the attachment device to overcome the residual spring force during attachment device application. Substrate layers that are deformed such that no, or minimal separation exists between the substrate layers will have no or insignificant residual spring force to overcome.

The terms "damped laminate" and "laminate" are used interchangeably herein to refer to a construction comprising at least two substrate layers and at least one layer of a vibration damping material comprising a viscoelastic material that has a lower storage modulus than the substrate layers it is positioned between.

The substrate layers for a typical article construction include but are not limited to materials such as stainless steel, aluminum, copper, carbon steel, lead, and various other materials which typically have a Young's modulus greater than about $5 \times 10^5$ psi ($34.5 \times 10^8$ Pascals) at the operating temperature of the application (typically about $-60°$ to $600°$ C.). The vibration damping layer has a storage modulus of typically less than about $1 \times 10^5$ psi ($6.9 \times 10^8$ Pascals) at the temperature of the application. The laminate can also be of a multiple layer construction that may have more than two substrate layers and also more than one vibration damping material layer. The construction could also have vibration damping layers adjacent to each other in layers or stripes or other patterns. The damping layers may also be continuous or discontinuous.

The terms "plastically deformed" and "plastic deformation" are used herein to describe the permanent change to the laminate's shape or profile or contour or features that occurs when the substrate layer(s) are exposed to a force or strain (typically from a punch tool and the tool's working surfaces) that imparts a force into the material that exceeds its yield modulus.

The term "substrate contact surface" as used herein refers to the surface area(s) of the laminate that the attachment device comes in contact with upon application and imparts the attachment device's force upon the laminate.

The term "working surfaces" as used herein refers to the surface(s) area(s) of a punch tool that come into physical contact with the laminate during the punch tool stamping operation.

DETAILED DESCRIPTION OF THE INVENTION

The first step in preparing the article of the invention typically involves preparing a damped laminate. A damped laminate is typically prepared by incorporating one or more layers of a vibration damping material into the laminate article typically by adding one layer or a plurality of layers of a vibration damping material during the manufacture of the article as an inner layer(s). The layer(s) may be continuous or discontinuous. The discontinuous layer may be separated by space(s) and/or a nondamping material. A continuous layer may comprise the same damping material or different damping materials adjacent to each other, thereby forming a continuous surface.

Vibration Damping Material

The vibration damping material includes a viscoelastic material or combination of different viscoelastic materials. Useful viscoelastic materials are those having a storage modulus of at least about 1.0 psi ($6.9 \times 10^3$ Pascals) and a loss factor of at least about 0.01, at the temperature and frequency of use. Advantageously and preferably, a layer(s) of the vibration damping material is placed in areas of high strain energy as an inner layer(s) to provide improved damping in the desired frequency and temperature range. The added damping layer(s) should increase the vibrational damping, as measured by the system loss factor, of the article or the structural material of which it is made, by at least about 10 percent in at least one vibrational mode as compared to a non-laminate construction. System loss factor is a measure of the damping in a structure.

A viscoelastic material is one that is viscous, and therefore capable of dissipating energy, yet exhibits certain elastic properties, and therefore capable of storing energy. That is, a viscoelastic material is an elastomeric material typically containing long-chain molecules that can convert mechanical energy into heat when they are deformed. Such a material typically can be deformed, e.g., stretched, by an applied load and gradually regain its original shape, e.g., contract, sometime after the load has been removed.

Suitable viscoelastic materials for use in the vibration damping materials of the present invention have a storage modulus, i.e., measure of the energy stored during deformation, of at least about 1.0 psi ($6.9 \times 10^3$ Pascals) at the frequency and temperature of operation. The storage modulus of useful viscoelastic materials can be as high as 500,000 psi ($3.45 \times 10^9$ Pascals); however, typically it is about 10–2000 psi ($6.9 \times 10^4$–$1.4 \times 10^7$ Pascals).

Suitable viscoelastic materials for use in the vibration damping materials of the present invention have a loss factor, i.e., the ratio of energy loss to energy stored, of at least about 0.01. Preferably the loss factor is at least about 0.1, more preferably about 0.5–10, and most preferably about 1–10, in the frequency and temperature range where damping is required (typically about 1–10,000 Hz and $-40°$ to $600°$ C. or more.) This loss factor is a measure of the material's ability to dissipate energy and depends on the frequency and temperature experienced by the damping material. For example, for a crosslinked acrylic polymer, at a frequency of 100 Hz, the loss factor at $68°$ F. ($20°$ C.) is about 1.0, while at $158°$ F. ($70°$ C.) the loss factor is about 0.7.

Preferred viscoelastic materials are those that remain functional over a wide range of temperatures, e.g., about −40° C. to about 300° C. Most preferred viscoelastic materials are those that cover the broadest temperature and frequency range at the desired minimum loss factor and storage modulus to achieve acceptable damping of the viscoelastic laminate article, and do not experience a significant degradation in properties due to long times at high temperatures or short excursions beyond these high temperature levels.

Useful viscoelastic damping materials can be isotropic as well as anisotropic materials, particularly with respect to its elastic properties. As used herein, an "anisotropic material" or "nonisotropic material" is one in which the properties are dependent upon the direction of measurement. Suitable viscoelastic materials include urethane rubbers, silicone rubbers, nitrile rubbers, butyl rubbers, acrylic rubbers, natural rubbers, styrene-butadiene rubbers, and the like. Other useful damping viscoelastic materials include polyesters, polyurethanes, polyamides, ethylene-vinyl acetate copolymers, polyvinyl butyral, polyvinyl butyral-polyvinyl acetate copolymers, epoxy-acrylate interpenetrating networks and the like. Specific examples of useful materials are disclosed or referenced in U.S. Pat. No. 5,183,863 (issued Feb. 2, 1993), U.S. Pat. No. 5,262,232 (issued Nov. 16, 1993) and U.S. Pat. No. 5,308,887 (issued May 3, 1994), all of which are incorporated herein by reference.

Examples of thermoplastic materials suitable for use as the vibration damping material in viscoelastic laminate articles according to the present invention include, but are not limited to, those selected from the group consisting of polyacrylates, polycarbonates, polyetherimides, polyesters, polysulfones, polystyrenes, acrylonitrile-butadiene-styrene block copolymers, polypropylenes, acetal polymers, polyamides, polyvinyl chlorides, polyethylenes, polyurethanes, and combinations thereof.

Useful viscoelastic materials can also be crosslinkable to enhance their strength and/or temperature resistance. Such viscoelastics are classified as thermosetting resins. When the viscoelastic material is a thermosetting resin, then prior to the manufacture of the viscoelastic laminate article the thermosetting resin is in a thermoplastic state. During the manufacturing process, the thermosetting resin is cured and/or crosslinked typically to a solid state, although it could be a gel upon curing as long as the cured material possesses the viscoelastic properties described above. Depending upon the particular thermosetting resin employed, the thermosetting resin can include a curing agent, e.g., catalyst, which when exposed to an appropriate energy source (such as thermal energy) the curing agent initiates the polymerization of the thermosetting resin. Particularly preferred viscoelastic damping materials are those based on acrylates.

In general, any suitable viscoelastic material can be used. The choice of viscoelastic material for a particular set of conditions, e.g., temperature and frequency of vibration, etc., is within the knowledge of one of skill in the art of viscoelastic damping. It is to be understood that blends of any of the foregoing materials can also be used.

Vibration Damping Material Additives

The vibration damping material of the present invention may further comprise an effective amount of a metal, fiberglass, glass, ceramic, and/or organic (such as polyesters, polyamides, epoxy resins, etc.) fibrous and/or particulate material. Optionally, the fibrous and/or particulate material can be thermally conductive, electrically conductive, or both. Herein, an "effective amount" of a fibrous material and/or particulate is an amount sufficient to impart at least improvement in desirable characteristics to the viscoelastic material, but not so much as to give rise to any significant detrimental effect on the structural integrity of the article in which the viscoelastic material is incorporated. Generally, the fibrous or particulate material is used in an amount effective to increase the strain energy ratio of a component containing the same amount and type of viscoelastic material without the fibrous or particulate material. Generally, an increase in the strain energy ratio of a factor of at least about two in at least one vibrational mode is desired. Typically, the amount of the fibrous material in the viscoelastic material is within a range of about 3–60 wt. percent, preferably about 10–50 wt. percent, more preferably about 15–45 wt. percent, and most preferably about 20–40 wt. percent, based on the total weight of the vibration damping material. Typically, the amount of the particulate material in the viscoelastic material is within a range of about 0.5–70 wt. percent, preferably about 1–45 wt. percent, more preferably about 5–40 wt. percent, and most preferably about 5–30 wt. percent, based on the total weight of the vibration damping material.

Fibrous Material Additives

The aforementioned fibrous material can be in the form of fibrous strands or in the form of a fiber mat or web, although fibrous strands are preferred. The fibrous strands can be in the form of threads, cords, yarns, filaments, etc., as long as the viscoelastic material can wet the surface of the material. They can be dispersed randomly or uniformly in a specified order. Preferably, the fibrous strands, i.e., fibers or fine threadlike pieces, have an aspect ratio of at least about 2:1, and more preferably an aspect ratio within a range of about 2:1 to about 10:1. The aspect ratio of a fiber is the ratio of the longer dimension of the fiber to the shorter dimension. Examples of useful fibrous materials in all applications of the present invention include but are not limited to nonmetallic fibrous materials, such as fiberglass, glass, carbon, minerals, synthetic or natural heat resistant organic materials, ceramic materials, and the like and metallic fibrous materials such as steel, stainless steel, copper, aluminum, gold, silver, lead, titanium, and their alloys and the like. Generally, high Young's modulus fibrous materials, i.e., those having a modulus of at least about 100,000 psi ($6.9 \times 10^8$ Pascals), are preferred.

Useful natural organic fibrous materials include, but are not limited to, those selected from the group consisting of wool, silk, cotton, and cellulose. Examples of useful synthetic organic fibrous materials include, but are not limited to, those selected from the group consisting of polyvinyl alcohol, nylon, polyester, rayon, polyamide, acrylic, polyolefin, aramid, and phenol. The preferred organic fibrous material for applications of the present invention is aramid fibrous material. Such a material is commercially available from Dupont Co., Wilmington, Del. under the trade names of "Kevlar" and "Nomex."

Generally, any ceramic fibrous material is useful in applications of the present invention. An example of a ceramic fibrous material-suitable for the present invention is NEXTEL™ which is commercially available from Minnesota Mining and Manufacturing Co., St. Paul, Minn. Examples of useful, commercially available, glass fibrous material are those available from PPG Industries, Inc. Pittsburgh, Pa., under the product name E-glass bobbin yarn; Owens Corning, Toledo, Ohio, under the product name "Fiberglass" continuous filament yarn; and Manville Corporation, Toledo, Ohio, under the product name "Star Roy 502" fiberglass roving.

Advantages can be obtained through use of fibrous materials of a length as short as about 100 micrometers. The fibers are not limited in length but much longer fibers may provide insufficient fiber interface and therefore decreased shearing surfaces between fibers. The fiber thickness or diameter for typical fibrous material ranges from about at least 5 micrometers. The thinner the fiber, the higher the surface area of the fibrous material for a given amount of fiber loading. Thus, preferred fibrous materials are very thin. The thickness of the fiber is also dependent upon the desired thickness of the overall damping material layer that will be used in the article. Thus, many common fibers may not be suitable if the overall damping material thickness is relatively thin (e.g., 4–10 micrometers).

Particulate Material Additives

The vibration damping material may also include an effective amount of one of the previously indicated particulate materials. The vibration damping material may include an amount of particulate material effective to improve vibrational damping of the article or the structural material of which the article is made by a factor of at least about two in strain energy ratio of at least one vibrational mode. Typically, this would require incorporating about 0.5 to 70 weight percent of the particulate material into the vibration damping material, based on the total weight of the vibration damping material. Combinations of particulate and fibrous materials may be used, typically about 0.5 to about 70 wt. percent based on the total damping material.

The previously mentioned particulate material(s) useful in the invention can be in the form of bubbles or beads, flakes, or powder, as long as the viscoelastic can wet the surface of the material. Preferably, the particulate material is on the size order of about 0.1 to about 5 micrometers and more preferably about 0.1 to about 2 micrometers.

Examples of useful particulate materials in applications of the present invention include metal, coated or uncoated glass and ceramic bubbles or beads, powers such as silica, aluminum oxide powder and aluminum nitride power; cured epoxy nodules, and the like, i.e., those having a modulus of at least about 10,000 psi ($6.9 \times 10^7$ Pascals), are preferred. More preferably, useful particulate materials have a Young's modulus of about 50,000 psi ($3.45 \times 10^8$ Pascals), and most preferable are those with a modulus of at least 100,000 psi ($6.9 \times 10^8$ Pascals). Blends of a particulate material and fibrous material can be used from about 0.5 wt. percent to about 70 wt. percent based on the weight % of damping material.

An additional potential benefit of using the previously mentioned fibers and/or particulates in the laminate is that the fibers and particulate may reduce the degree of plastic deformation in the deformation area required to permanently displace sufficient damping material to improve the stress, force, torque or pressure retention in the attachment device. The fibers and/or particulates may provide a high modulus mechanical force connection through the damping material and to the substrate layers, in effect, bypassing or bridging the damping material and creating a mechanical connection that can support the attachment device's force with stress relaxation less than that of the damping material. When a fastener device is applied, the force between substrate layers can pass through the particulates and/or fibers that connect both substrate surfaces to provide reduced damping viscoelastic stress relaxation. The fibers and/or particulate can be used in an amount to optimize fastener device force retention, but not to reduce the damped articles' effectiveness as a damping system, those skilled in the art would be able to select a proper balance for a given application. Those skilled in the art can also select the fibers, particulates and fillers herein disclosed that can support the attachment devices attachment force without mechanical failure. The total amount of such particles and/or fibers for this purpose typically ranges from about 1 to about 90%, preferably about 20 to about 90%, and most preferably about 50 to about 90%, based on the total weight of the vibration damping material. The fiber diameters for fibers for such a purpose typically ranges from about 0.02 to about 125%, preferably about 10 to about 100%, and most preferably about 50 to about 100%, based on the average thickness of the vibration damping layer in which the fibers are contained in a non-deformation area. The particle size for particles for such purpose typically ranges from about 0.02 to about 125%, preferably about 10 to about 100%, and most preferably about 50 to about 100%, based on the thickness of the vibration damping layer in a non-deformation area.

Another potential benefit of using fibers and/or particulates of a sufficiently large size and loading in the laminate is that the fibers and particulate may eliminate the need for plastic deformation of the laminate required to permanently displace sufficient damping material to improve the stress, force, torque or pressure retention in the attachment device. The fibers and/or particulates will provide a high modulus mechanical force connection through the damping material and between the substrate layers, in effect, completely or partially bypassing or bridging the damping material and creating a mechanical connection that can support the attachment device's force and/or stress, and/or pressure, with the stress relaxation less than that of the damping material. When a fastener device is applied, the force between substrate layers can pass through the particulates and/or fibers that connect both substrate surfaces to provide reduced stress relaxation as the damping material is bypassed. The fibers and/or particulate can be used in an amount to optimize fastener device force retention. Depending on size and loading used, the damped articles' effectiveness as a damping system may be reduced somewhat. Those skilled in the art would be able to select a proper balance for a given application. Those skilled in the art can also select the fibers, particulates and fillers that can support the attachment devices attachment force without mechanical failure (such as crushing, etc.). The useful modulus of the fibers or particulates is greater than 100 psi, preferably greater than 1000 psi, and most preferably greater than 10,000 psi and in a solid or hollow design that can support the fastener force. The total amount of such particles and/or fibers for this purpose typically ranges from about 10 to about 90%, preferably about 20 to about 90%, and most preferably about 50 to about 90%, based on the total weight of the vibration damping material. The fiber diameters for fibers for such a purpose typically ranges from about 10 to about 125%, preferably about 20 to about 125%, and most preferably about 50 to about 125%, based on the average thickness of the vibration damping layer in which the fibers are contained in a non-deformation area. The particle size for particles for such purpose typically ranges from about 10 to about 125%, preferably about 20 to about 125%, and most preferably about 50 to about 125%, based on the average thickness of the vibration damping layer in which it is contained in a non-deformation area.

In addition, the particulate and/or fibrous material can improve the thermal and/or electrical conductivity between the substrate and/or bonding layers that the damping material layer with the added fibrous and/or particulate material has been positioned between; as compared to the same damping material layer with no added particulates and/or fibers.

The benefit of adding the thermally conductive fibers and/or particles can be better understood by the following example.

50% by weight aluminum oxide ($Al_2O_3$) was added to a damping polymer mixture. The damping polymer is an acrylate. The mixture is coated and cured to a thickness of 0.100". The thermally conductive damping material was then positioned between two substrate (steel) layers. In addition a second same damping polymer mixture was coated with no added fibers and/or particulates that had a higher thermal conductivity than of the polymer mixture. The second mixture was then positioned between two substrate layers as used for the thermally conductive damping material.

Using a thermal resistance test, the flow of heat through the two constructions was compared. The thermal resistance test on the test sample using a damping material with no added fiber and/or particulates had a thermal conductivity of 0.186 watts/m°C. The thermally conductive damping material sample had a thermal conductivity of 0.322 watts/m°C.

The thermally conductive damping materials will tend to have a higher effective modulus than the same damping material with no added thermally conductive particles and/or fibers.

In certain applications that have been designed to optimize the damping of a seismic or wind-sway damper (such as in large displacement dampers) or for a laminate enclosure, significant amounts of heat may be generated in the damping material layer (large displacement damper) itself during straining or may be entrapped in an enclosure (such as in disk drive laminate cover) that has an associated heat source.

The damping material is not a good conductor of heat; thus, the heat generated in a large displacement damper may not be dissipated quickly enough so that the added heat into the damping material may significantly shift the temperature of the damping material and shift the loss factor and storage modulus of the damping material and change the performance of the large displacement damper. Improved thermal conductivity in the damping material will limit the temperature change in the damping material.

In a damped laminate cover of a disk drive, the cover can be a significant path for heat to dissipate from the drive through conduction, convection or radiation. The heat is generated in the drive by motors or circuit board integrated circuit chips, resistors, capacitors, etc.

By adding a thermally conductive damping material in the laminate cover, more heat is allowed to flow through the cover. This increased heat flow through the thermally conductive damped laminate cover will reduce the temperature in the drive. Excessive temperatures in a drive can damage components and reduce drive performance and/or reliability.

For thermally conductive damping materials, the useful loading of the thermally conductive particles and/or fibers in the damping material is from 10–95%, preferred is 20–95% and most preferred 50–95% based on the total weight of the vibration damping material.

Useful articles that contain at least one layer of a thermally conductive damping material layer include, but are not limited to, large displacement damper, constrained layer dampers, laminated pans, laminated covers, laminated castings, laminated sheets, laminated baffles, and laminated vents.

Useful damping material polymers include, but are not limited to, acrylates, epoxy-acrylates, silicones, acrylate-silicone mixture and cyanate esters.

One skilled in the art can determine the best means to incorporate the vibration damping material into the articles.

In addition, previously discussed bonding layers may be included in a similar fashion in the articles. The bonding adhesive layer thickness should be designed to the minimum thickness acceptable to minimize any thermal conductivity losses. Bonding layers may also include thermally conductive materials to further minimize any thermal conductivity losses.

In addition, the substrate layer of an article can act as a heat sink. The substrate heat sink design could further be designed to maximize the surface area of the constraining layer to increase heat loss due to convection, radiation, or conduction.

In the laminate article of the invention which is required not to be deformed, the same substrates, vibration damping materials, additives, articles made therefrom, fastening and fastened assemblies, test methods, torque retention, etc., applies as does for the deformed articles, except that a deformed area with reduced vibration damping mass is not required. However, the particulates and/or fibers are required as well as particular loadings, sizes, and moduluses.

Other Additives

In addition to fibers and particulate material, the vibration damping material can include additives such as fillers (e.g. talc, etc.), colorants, toughening agents, fire retardants, antioxidants, antistatic agents, and the like. Sufficient amounts of each of these materials can be used to effect the desired result.

The vibration damping material that provides the significant portion of the damping for a given material layer may also include an effective mount of an epoxy resin (with or without the previously mentioned particulate or fibrous material) dispersed within the damping material. The vibration damping material may include an mount of epoxy resin effective to improve the mechanical integrity of the viscoelastic laminate article. The epoxy resin material may have damping properties. An example of a suitable damping material incorporating an epoxy resin is disclosed in U.S. Pat. No. 5,262,232 (issued Nov. 13, 1993), incorporated herein by reference. Typically, the amount of epoxy resin incorporated into the vibration damping material would be about 0.5 to 95 weight percent, more typically about 5 to about 50 weight percent, based on the total weight of the vibration damping material.

Substrate Layers

The substrate(s) useful in the article of the invention can be any material that can be plastically deformed (such as a plastic or metal). Examples of suitable substrates include but are not limited to those selected from the group consisting of stainless steel, aluminum, copper, carbon steel, lead, polyethylenes, polyolefins, polycarbonates, polystyrenes, polyimides, polyesters, polyacetates, and vinyl copolymers, poly acetals, phenolics. The substrate layers may optionally be coated with a coating such-as paint, etc.

Optional Laminate Layers

The laminate article of the invention optionally further comprises additional layer(s) besides the substrate and vibration damping layers. The article may optionally further comprise a bonding material layer(s), for example. The bonding material layer(s) may be bonded between a substrate layer and a vibration damping layer(s), wherein the storage modulus of each bonding material layer is higher than that of the vibration damping layer to which it is bonded. Examples of useful binding layers include but are not limited to those selected from the group consisting of epoxy resins and cyanoacrylates. Preferably, the storage modulus of the binding material layer is less than that of a substrate to which it is bonded.

Tooling and Method of the Invention

The damped laminate article of the invention is typically made by a method wherein at least a portion of the vibration damping material is permanently displaced and the substrate layer(s) plastically deformed in the intended attachment area to provide improved force retention of the attachment device as compared to a laminate that does not have the damping material permanently displaced and the substrate layers plastically deformed (and does not use a fibrous, particulate or filler enhanced damping material to bridge the damping material) in the same area. The vibration damping material is usefully permanently displaced when the force retention is at least about 10 percent improved over a nonmodified laminate, preferably greater than about 20 percent improved, and most preferably greater than about 30 percent improved, and optimally greater than about 35 percent improved, as determined via "Laminate Force Retention Test Method for Laminates with Through-Holes" set forth herein.

The damping material is typically permanently displaced and the substrate layers plastically deformed in the intended fastener area by means of applying pressure to at least one outer substrate layer surrounding the vibration damping material layer and forcing the vibration damping material away from the intended fastener area. The substrate layers take on a permanent set (plastic deformation) from the force or pressure used to displace the vibration damping material thus hindering the vibration damping material from recovering back into the area from which it was displaced and also provides a laminate article that may not have a significant residual spring force between the laminate substrate layers. The attachment device would need to bring together the substrate layers and overcome the residual spring force that could still exist following the permanent displacement of the damping material. If a substrate layer is not sufficiently plastically deformed, it can recover back to a portion of its pre-deformation position. This can create a spacing between substrate layers and a residual spring force. When the attachment device is attached in this area, this residual spring force can reduce the force retention of the attachment device as the initial force used to apply the attachment device is used to overcome the residual spring force in the substrate layers versus a force being used to overcome frictional losses or other mechanical impediments to the fastener device, thus potentially reducing the overall force retention once the system stress relaxes. This spacing may also allow a portion of the damping material to recover into this spacing after the stamping operation. The damping material is still permanently displaced from this area, but with more optimized deformation of the substrate it could be reduced further if the spacing were reduced further.

The punch tools useful according to the invention can be used to concentrate force(s) in a desired localized area to permanently displace at least a portion of vibration damping material in the intended attachment area of the damped laminate article and to plastically deform at least one substrate layer in such a way as to eliminate or minimize the amount of elastic recovery of the vibration damping material and also to limit the residual spring force between substrate layers and potentially to feature the substrate surface to minimize dynamic friction during fastener application.

The method of the invention typically involves applying a damping material by coating, spraying or laminating etc. onto a substrate layer. An opposite substrate layer is applied over the damping material creating a laminate material construction. Additional damping layers and substrate layers can be added. The laminate material can be in roll or sheet form. The laminate material is then fed or placed into stamping or forming equipment (with associated dies, etc.) to produce an article. In specific reference to the attachment areas of the article, and as an example, a damped laminate may first have a hole pierced or cut through the entire laminate (a through hole) by conventional means such as a standard punch, laser, water jetstream, etc. to accommodate the attachment device. The hole can be of a wide variety of shapes. It can be circular, elliptical, square, rectangular, etc. The hole can be symmetrical or asymmetrical. The size of the hole will vary depending upon the intended use of the article of the invention. Typically the hole will have a diameter of about 0.005 inches ($2 \times 10^{-4}$ cm) to about 36 inches (91 cm). The hole area can then be subjected to an applied force via a specifically designed punch tool that uses a specific design of a punch to concentrate the punch force to permanently displace at least a portion of the vibration damping material and plastically deform the substrate layer(s) in the intended deformation area. Typically, the location of the hole is such that the hole is surrounded by a deformation area. The hole may also be partially surrounded by a deformation area. Typically the area of each deformation area surrounding or partially surrounding at least one hole is about 0.05 to about 100 times the area of each hole, preferably about 0.05 to about 10 times the area of each hole.

At least one substrate in the article of the invention may have a variable thickness in a deformation area. The article of the invention may have at least one protrusion in the first and/or second substrate layer. The punch tool is selected such that the force applied by the tool to the laminate substrate(s) is concentrated in the area to be deformed in a manner to permanently displace at least a portion of the vibration damping material mass from the deformed area. If the tool is not designed in a fashion to direct the forces in a manner to displace the vibration damping material in the deformation area, the substrate layer(s) may deform but the vibration damping material layer will not be significantly reduced in mass. The vibration damping material will allow the substrate layers to slip in a manner as to minimize the punch's effectiveness in permanently displacing the damping material. If the punch is not designed to minimize slippage of the substrate layers during the stamping process and also to concentrate the forces to displace or extrude the damping material from between the substrate layers, the punch will not be as effective. Known punches typically are not as effective in displacing the damping polymer as punches of the invention as they permit the substrate layers to slip laterally during the stamping process versus being deformed in a manner to significantly displace the damping material and minimize lateral displacement of the substrate layers.

The punch tool also will impart a feature or deformation into the laminate by plastically deforming at least one substrate, in addition to displacing at least a portion of the vibration damping material. The outer substrates of the laminate may contain protrusions and/or depressions such as ledges, notches, etc.

Design considerations of the punch tool of the invention include the tool's ability to limit the amount of slippage of the outer substrate layers (the first and second substrate layers) by applying frictional and/or gripping and/or holding forces to the substrate areas and to concentrate the deformation forces of the tool to permanently displace the damping material, deform the substrate layers to minimize substrate layer residual spring force and minimize the recovery of the damping material and feature the deformation area to minimize the surface area that will contact the fastener device and reduce dynamic friction. The reduced slippage of the substrate layers which occurs when using the tool of the invention limits the amount of force not effectively used to reduce the vibration damping mass in the deformation area.

When using a known punch tool rather than the one of the invention, the substrate layers may tend to slip on the vibration damping material in a manner that does not allow optimum displacement of the vibration damping material. The slippage can also be detrimental in a stamping operation as the lateral movement of the substrate could distort the substrate layer in an undesirable way and interfere with later operations or part dimensions.

The laminate of the invention does not require a hole for attachment or as an outlet for the vibration damping material to be forced into. In applications where a hole is not desirable or where the area to be used for attachment is not near an edge to provide a outlet for the vibration material to be forced to, the tool design is preferably such as to deform the substrate layers to provide a pocket or expansion area for the damping material to be forced into. If an outlet for the viscoelastic is not provided, the substrate layer may have significant deformations or features but the damping material may not have significant damping material displacement in the deformation area and thus the force retention may not be significantly improved.

Methods or materials to improve the tool's operation in displacing the vibration damping material and plastically deform the substrate during the stamping operation include but are not limited to the following:

a) Heating the damped laminate to lower the modulus of the vibration damping material for the deformation of the laminate. This added heat allows the vibration damping material to be more easily displaced (less force needed to displace) and it's modulus is lower. Heat applied during stamping is much more desirable, simple and cost effective than using heat during the assembly of the laminate article of the invention and a second article with an attachment device. Heat can be applied to the laminate during or before the deformation process step. The heat can be applied using ultraviolet, or infrared heat sources, steam, heated air, ovens, etc., such that the damping material's storage modulus is lowered. The damping material is usefully reduced in modulus if the storage modulus at the deformation step is reduced by at least 10%, preferably by 25% and most preferably by at least 50%;

b) Using vibration damping materials with little to no cross-linking to reduce the force needed to displace the vibration damping material during the deformation process;

c) Making and using a damped laminate wherein the vibration damping layer initially has less mass in the area(s) to be deformed to reduce the force needed to displace the damping material. (This method, however, requires a more complex process to manufacture the laminate article); and d) Using lubricants to reduce the frictional losses in the tool as it deforms the substrate(s). Lubricants will also tend to increase the tool's life.

The tool used to reduce and/or eliminate the vibration damping material will also deform the substrate layer(s). The deformation of these layer(s) can lead to a hole size reduction as the substrate layer can be plastically deformed to narrow the hole size. (Hole size could also be increased). The deformation process can also lead to slightly raised substrate surfaces or protruding edges caused by the particular tool used to displace the vibration damping material. Knowledge that this will occur is sufficient to design the completed laminate article such that desired design criteria can be met, such as for a specific finished hole diameter. For example, the initial hole diameter can be selected to be larger than the desired final hole diameter such that when the deformation process occurs, the substrate layers are deformed such that the hole diameter will decrease due to the plastic deformation of the substrate layers to yield a final desired article having the desired hole diameter.

The method of the invention can be designed to minimize the displacement of the substrate layer(s) in areas that are not desired if the deformation of the substrate layer(s) is problematic. Options to accomplish this include but are not limited to the use of secondary tools after the deformation process that reform the substrate layers to a more desirable configuration while having a minimal effect on the force retention of the laminate. Secondary tools can enlarge the holes (reaming or drilling) if the initial hole size cannot be sufficiently enlarged to be at a final desired hole size following the deformation operation. The deformation area can also be flattened by other tools to lower or change the deformation area profile.

The present invention can be better understood by referring to FIGS. 1–30.

FIG. 1 is a top view of a disk drive showing disk drive cover 6 wherein a vibration damping material laminate is the cover construction material. The attachment devices (screws) are indicated by reference numerals 11.

Figure 2:
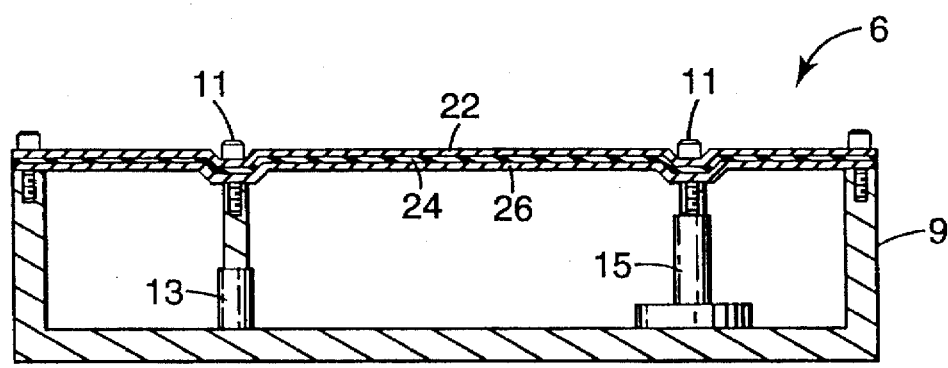
FIG. 2 is a cross-section of the disk drive taken along line 2—2 in FIG. 1.

FIG. 2 is a cross-section of the disk drive taken along line 2—2 of FIG. 1. The cross-section shows the screws 11 holding the cover 6 in the desired location. This cover 6 uses screw type fasteners 11 that apply an attachment force to the cover 6 and the base 9 that the cover 6 is attached to via the screws 11. The screws 11 also connect and locate the top cover 6 and the spindle 13 of the disk drive (the unit that rotates the disks so that a read/write head can be located over the data on the disk) and actuator 15 (the unit that moves the read/write head in a horizontal motion across the disks to provide access to different radii of the disk where data is written or stored). For clarity, the disk assembly and read/write heads and arms assembly that extend over the disks have been removed. The cover comprises upper and lower substrate layers 22 and 26, respectively, and vibration damping material layer 24.

Figure 3A:
FIG. 3A is a partial cross-section of the top of the disk drive taken along line 3—3 of FIG. 1.

FIG. 3A is a partial cross-section of the disk drive cover 6 taken along line 3—3 of FIG. 1. The cross section shows a laminate of upper substrate layer 22, lower substrate layer 26, and vibration damping material layer 24 bonded therebetween.

Figure 3B:
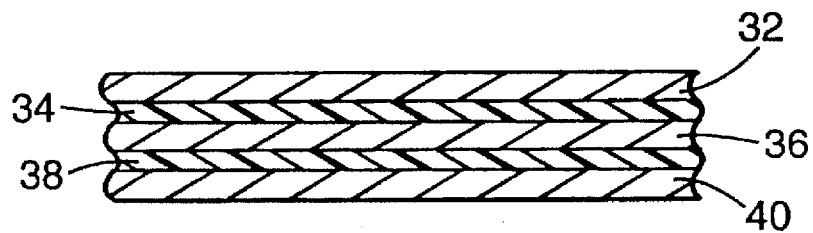
FIG. 3B is a second embodiment of a partial cross-section of the top of the disk drive taken along line 3—3 of FIG. 1.

FIG. 3B is a second embodiment of a partial cross-section of the disk drive cover taken along line 3—3 of FIG. 1. The cross-section shows the substrate layers 32, 36 and 40 and vibration damping layers 34 and 38.

Figure 3C:
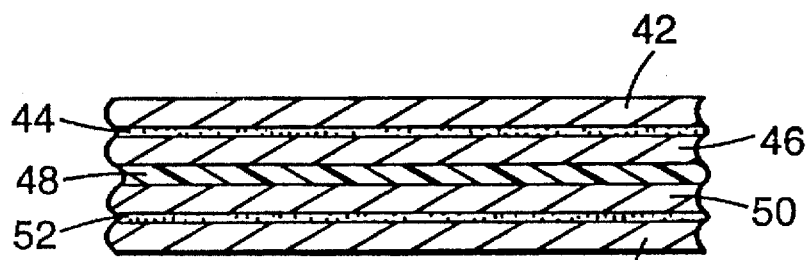
FIG. 3C is a third embodiment of a partial cross-section of the top of the disk drive taken along line 3—3 of FIG. 1.

FIG. 3C is a third embodiment of a partial cross-section of the disk drive cover taken along line 3—3 of FIG. 1. The cross-section shows the substrate layers 42, 46, 50 and 54, vibration damping layer 48, and bonding material layers 44 and 52 (such as epoxy resins) all bonded together in a laminate.

Figure 3D:
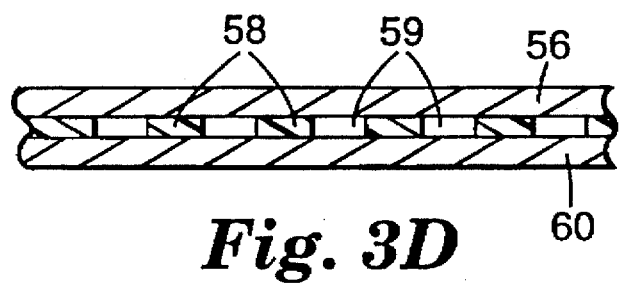
FIG. 3D is a fourth embodiment of a partial cross-section of the top of the disk drive taken along line 3—3 of FIG. 1.

FIG. 3D is a fourth embodiment of a partial cross-section of the disk drive cover taken along line 3—3 of FIG. 1. The cross-section shows the substrate layers 56 and 60, sections of vibration damping material 58 and spaces 59 and/or nonvibration damping material therebetween.

Figure 3E:
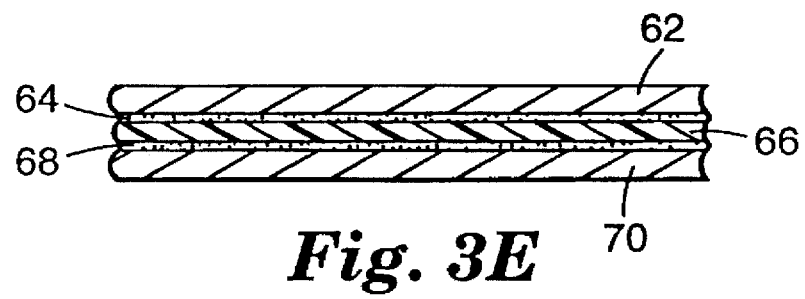
FIG. 3E is a fifth embodiment of a partial cross-section of the top of the disk drive taken along line 3—3 of FIG. 1.

FIG. 3E is a fifth embodiment of a partial cross-section of the top of the disk drive taken along line 3—3 of FIG. 1. The cross-section shows the substrate layers 62 and 70, vibration damping material layer 66, and bonding material layers (such as epoxy resins) 64 and 68 all bonded together to form a laminate.

Figure 4:
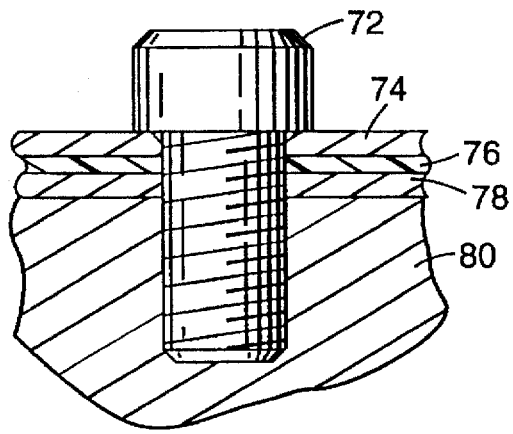
FIG. 4 is a partial cross-section of the top of the disk drive taken along line 4—4 FIG. 1.

FIG. 4 is a partial cross-sectional view of line 4—4 of FIG. 1. The cross-section shows a laminate comprising upper substrate layer 74, lower substrate layer 78, and vibration damping layer 76 and the attachment device (screw) 72 securing the laminate to the base 80. The laminate of FIG. 4 does not have the substrate layer 74 deformed or the vibration damping layer 76 reduced to have improved force retention characteristics.

Figure 4A:
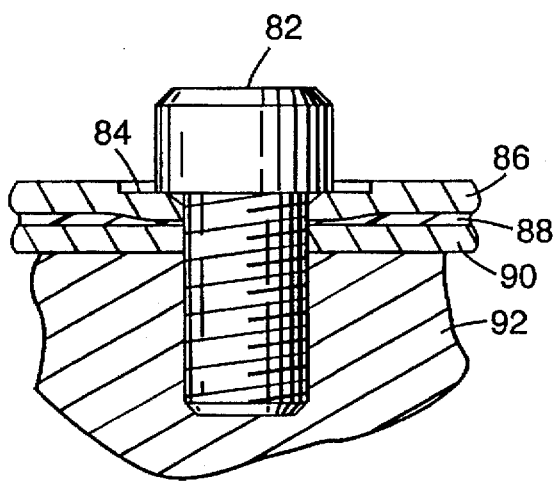
FIG. 4A is a partial cross-section of the top of the disk drive with the present invention.

FIG. 4A is a schematic cross-sectional view of line 4—4 of FIG. 1. The cross-section shows a laminate incorporating a deformation area of the invention comprising upper substrate layer 86, vibration damping layer 88, and lower substrate layer 90 and the attachment device (screw) 82 securing the laminate to base 92. The laminate here does show the vibration damping layer 88 reduced in the deformation area to have improved force retention characteristics. Numeral 84 represents the deformation into the top of the upper substrate 86.

Figure 5:
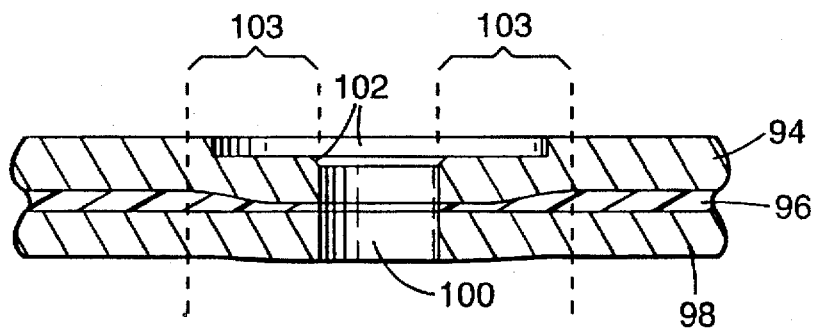
FIG. 5 is a partial cross-section of the top of the disk drive showing the mounting hole.

FIG. 5 shows a partial cross-section of a laminate of the invention comprising upper substrate layer 94, lower substrate layer 98, and damping material layer 96 with a portion of the damping material 96 displaced so as to provide an improvement in the force retention of the attachment device (screw, bolt, nail, rivet, etc.) that might use a pierced hole 100 (the hole can be any geometric shape- round, square, oblong, star, octagon, etc. which the attachment device can fit through and be applied) through which the attachment device is put to engage the base or other components of the attachment device (nuts for a bolt, etc.). The attachment device is not shown in the cross-section. The cross-section also shows the upper substrate layer 94 deformed, deformation area 103, and deformation 102.

FIGS. 6–10I show other embodiments of partial cross-sections of articles of the invention. FIGS. 6–10I show embodiments wherein a portion of viscoelastic material is displaced and the substrate is deformed so as to provide an improvement in the force retention of the attachment device with which it is used. The attachment device is not shown in the cross-sections. Some fastener devices use a pierced hole through which the fastener is put to engage the base or other components of the fastener device (nuts for a bolt, etc.). The hole also can be used solely for an area for the damping material to be forced into during the deformation process. An attachment device that does not use the hole can be used in the deformation area also (clamp, etc.). The cross-sections also shows the substrate layer(s) deformed. The deformed region of the substrate is typically surrounding the pierced hole area for fastener devices requiring a through hole. The deforming can occur on one or both sides of the laminate and/or in an interior substrate layer(s).

FIGS. 5–10F show the holes that the extension of the attachment device (shaft of a screw, for example) may have to extend through to engage the base or other components of the attachment device. The attachment device may also extend around the hole (clamps, etc.) but not pass through it. The hole may serve merely as an area for the damping material to be displaced into during the deformation process.

The area that has at least a portion of the vibration damping material displaced or removed (deformation area) typically extends to an area equal or larger than the attachment device contact area with the laminate. The attachment device could extend outside the deformation area, but this would not be an optimum use of the invention in terms of achieving the optimum force retention for a given force used to apply the attachment device. The various deformation designs of the substrate can be combined and otherwise varied. The embodiments disclosed are not intended to limit the invention.

Figure 6:
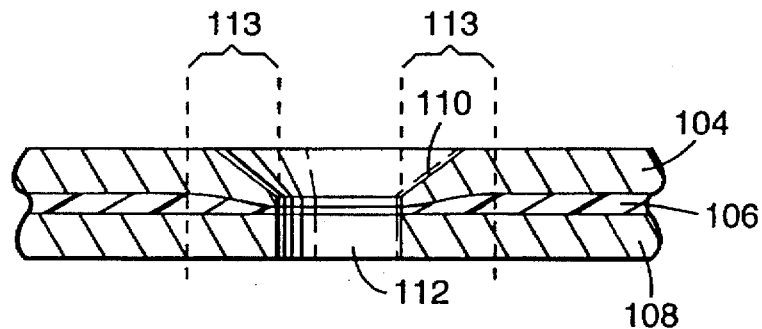
FIG. 6 is a second embodiment of a partial cross-section of the top of the disk drive showing the mounting hole.

FIG. 6 is a partial cross-section of the article of the invention showing upper substrate layer 104, lower substrate 108, vibration damping layer 106, hole 112, deformation 110 of the upper substrate 104, and deformation area 113.

Figure 7:
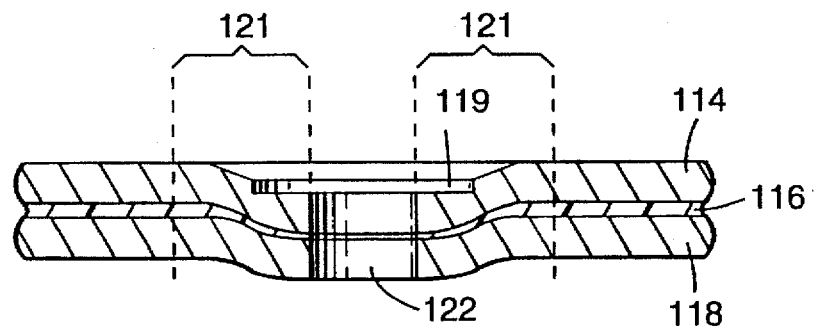
FIG. 7 is a third embodiment of a partial cross-section of the top of the disk drive showing the mounting hole.

FIG. 7 is a partial cross-section of the laminate article of the invention comprising upper substrate layer 114, lower substrate layer 118, vibration damping layer 116, hole 122, deformation 119 of the upper substrate 114, and deformation area 121, the deformation area in an embossed area.

Figure 8:
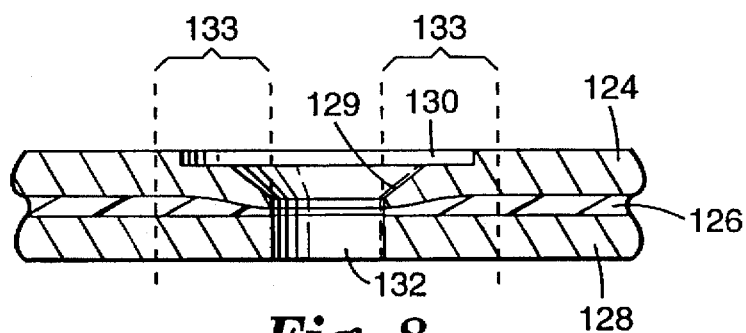
FIG. 8 is a fourth embodiment of a partial cross-section of the top of the disk drive showing the mounting hole.

FIG. 8 is a partial cross-section of the laminate article of the invention comprising upper substrate layer 124, lower substrate layer 128, vibration damping layer 126, hole 132, deformations 130 and 129 of the upper substrate 124, and deformation area 133.

Figure 9:
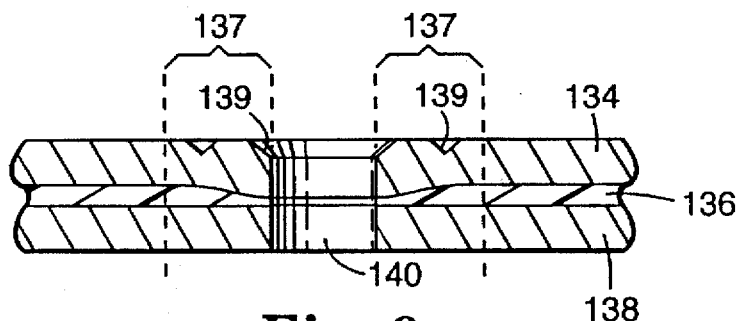
FIG. 9 is a fifth embodiment of a partial cross-section of the top of the disk drive showing the mounting hole.

FIG. 9 is a partial cross-section of the laminate article of the invention comprising upper substrate layer 134, lower substrate layer 138, hole 140, vibration damping layer 136, deformation 139 of the upper substrate layer 134, and deformation area 137.

Figure 10A:
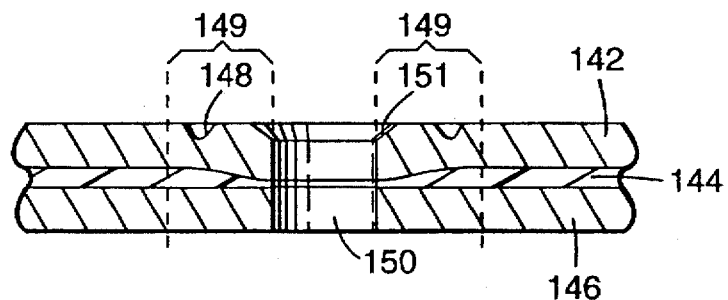
FIG. 10A is a sixth embodiment of a partial cross-section of the top of the disk drive showing the mounting hole.

FIG. 10A is a partial cross-section of the laminate article of the invention comprising upper substrate layer 142, lower substrate layer 146, hole 150, vibration damping layer 144, deformations 148 and 151 of the upper substrate layer 142, and deformation area 149.

Figure 10B:
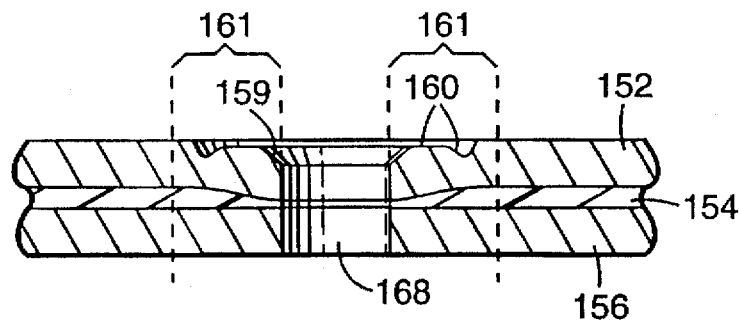
FIG. 10B is a seventh embodiment of a partial cross-section of the top of the disk drive showing the mounting hole.

FIG. 10B is a partial cross-section of the laminate article of the invention showing a laminate comprising upper substrate layer 152, vibration damping layer 154, lower substrate layer 156, hole 168, deformations 160 and 159 of the upper substrate layer 152, and deformation area 161.

Figure 10C:
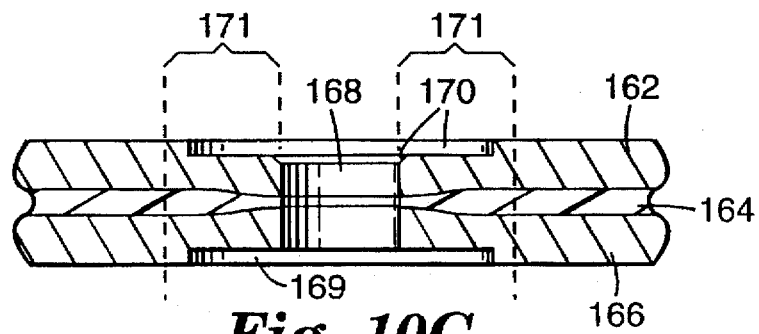
FIG. 10C is an eighth embodiment of a partial cross-section of the top of the disk drive showing the mounting hole.

FIG. 10C is a partial cross-section of the laminate article of the invention comprising upper substrate layer 162, lower substrate layer 166, vibration damping layer 164, hole 168, deformation 170 in the upper substrate layer 162, and deformation area 171, and deformation 169 in the lower substrate 166.

Figure 10D:
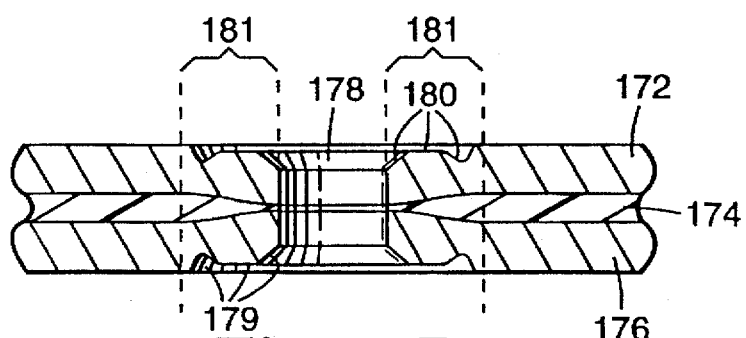
FIG. 10D is a ninth embodiment of a partial cross-section of the top of the disk drive showing the mounting hole.

FIG. 10D is a partial cross-section of the laminate article of the invention comprising upper substrate layer 172, lower substrate layer 176, hole 178, vibration damping layer 174, deformations 180 and 179 of the upper and lower substrate layers 172 and 176, and deformation area 181.

Figure 10E:
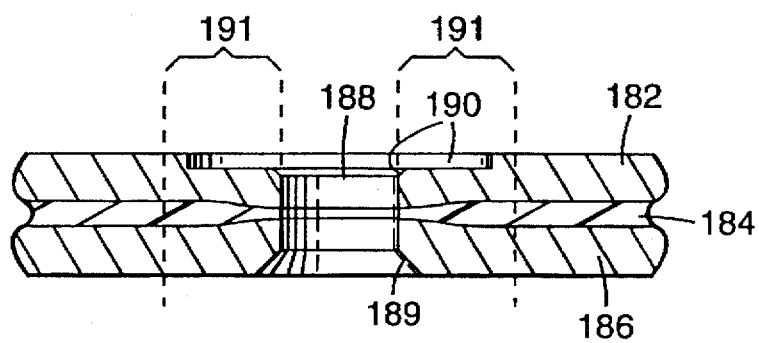
FIG. 10E is a tenth embodiment of a partial cross-section of the top of the disk drive showing the mounting hole.

FIG. 10E is a partial cross-section of the laminate article of the invention comprising upper substrate layer 182, hole 188, vibration damping layer 184, lower substrate layer 186 and deformation 189 of the lower substrate layer 186, deformation 190 of the upper substrate 182, and deformation area 191.

Figure 10F:
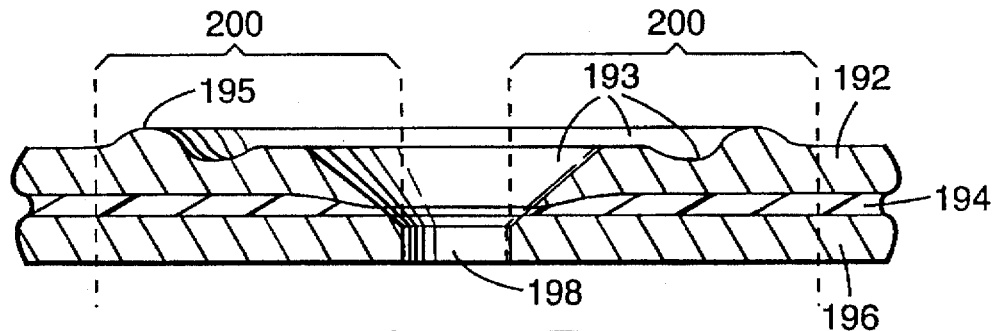
FIG. 10F is a eleventh embodiment of a partial cross-section of the top of the disk drive showing the mounting hole.

FIG. 10F is a partial cross-section of the laminate article of the invention comprising upper substrate layer 192, lower substrate layer 196, vibration damping layer 194, hole 198, deformation 193 and protruding area 195 of the upper substrate layer 192, and deformation area 200.

Figure 10G:
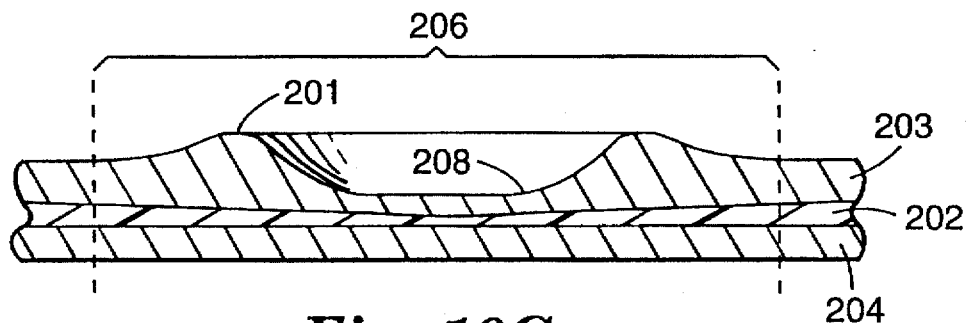
FIG. 10G is a partial cross-section of the top of the disk drive showing the fastening area.

FIG. 10G is a partial cross-section of the laminate article of the invention comprising upper substrate layer 203, vibration damping layer 202, lower substrate layer 204, recessed area 208 and protruding area 201 of the upper substrate layer 200, and deformation area 206, wherein deformation 208 can serve as the attachment area.

Figure 10H:
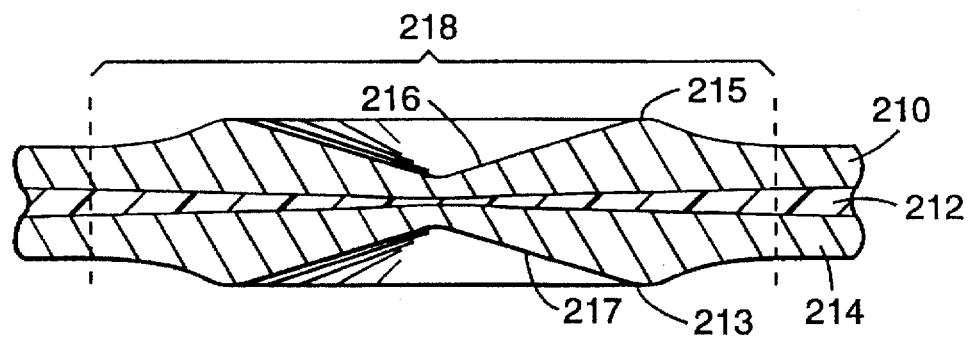
FIG. 10H is a second embodiment of a partial cross-section of the top of the disk drive showing the fastening area.

FIG. 10H is a partial cross-section of the laminate article of the invention comprising upper substrate layer 210, lower substrate layer 214, protruding areas 215 and 213, vibration damping layer 212, deformation area 218, and deformations 216 and 217 which can serve as the attachment area.

Figure 10I:
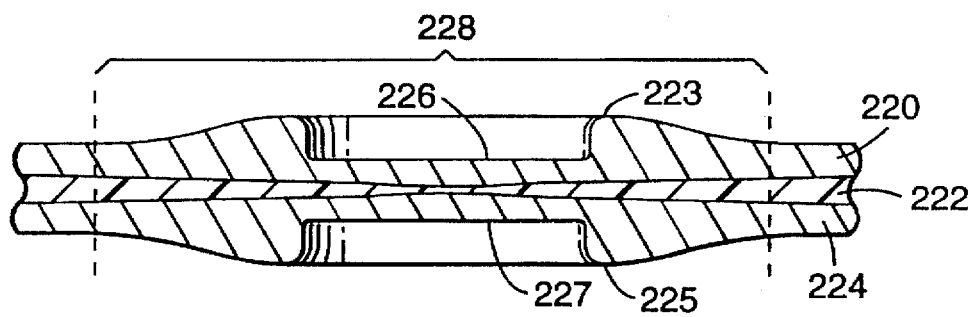
FIG. 10I is third embodiment of a partial cross-section of the top of the disk drive showing the fastening area.

FIG. 10I is a partial cross-section of the laminate article of the invention comprising upper substrate layer 220, vibration damping layer 222, lower substrate layer 224, deformation area 228, protruding areas 223 and 225, and deformations 226 and 227 which can serve as an attachment area.

Figure 11:
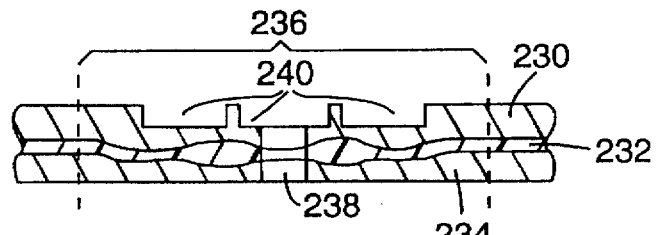
FIG. 11 is fourth embodiment of a partial cross-section of the top of the disk drive showing the fastening area.

FIG. 11 is a cross-section of the laminate article of the invention showing upper substrate layer 230, vibration damping layer 232, lower substrate layer 234, hole 238, deformation 240 in the upper substrate layer 230 and deformation area 236.

Figure 12:
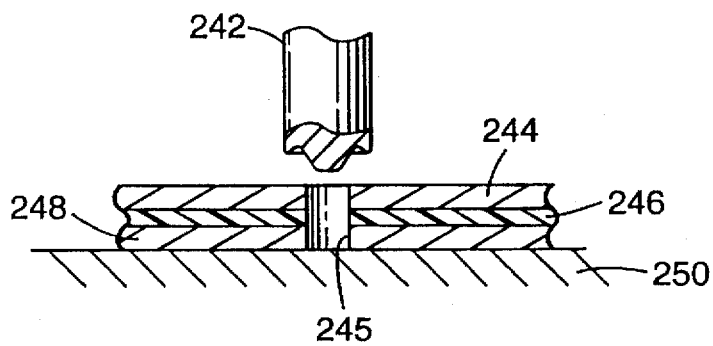
FIG. 12 is a cross-section of a punch of the invention and a laminate having a hole which has not been modified.

FIG. 12 illustrates the method of the invention with a tool of the invention. A punch tool 242 having a "V" shaped protrusion and surrounding gripping features is used to deform a laminate having upper substrate layer 244, vibration damping layer 246, hole 245, and lower substrate layer 248, which rests on laminate support surface 250.

Punch tools have working surface(s). The working surface is that part of the punch tool that comes into contact with the laminate during the usage of the punch tool.

FIGS. 13–32 show cross-sections of various tools that can be used to achieve some degree of deformation in the substrate layer(s) and displacement of the vibration damping material. These tools are typically mounted in a stamping press that engages the tool to the laminate surface(s) and applies the force to deform the substrate layer(s) and displace the vibration damping material in the deformation area and to plastically deform the substrate(s) to achieve the improved fastening systems force retention. These punches can be used with laminates that have holes or no holes.

For laminates with holes, the tool used will always be larger than the minimum diameter or radius point of the hole. Some tools or punches used to pierce holes, emboss, or coin areas of the laminate will have similar tool features, but are designed to accomplish different functions in making the laminated article. For example, FIG. 13A shows a tool punch used to pierce a hole. This punch could also be used to displace the vibration damping material and deform the substrate layer if used with a larger diameter than the hole. Other punches that could be used include but are not limited to those selected from the group consisting of round punches, flat punches, flat punches with a protrusion, bullet punches, and "V" styled punches as found in FIGS. 13–17, 19, and 22.

Figure 13:
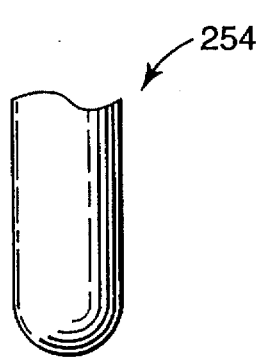
FIG. 13–26 are side views of different embodiments of punches.
Figure 13A:
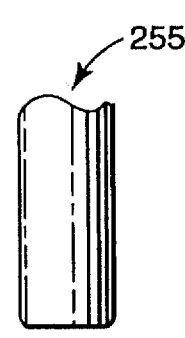

FIG. 13 is a side view of a known bullet punch 254 that can be used to make the article of the invention.

FIG. 13A is a side view of a known flat punch 255 that can be used to make the article of the invention.

Figure 14:
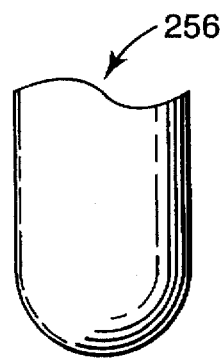

FIG. 14 is a side view of a known round punch 256 that can be used to make the article of the invention.

Figure 15:
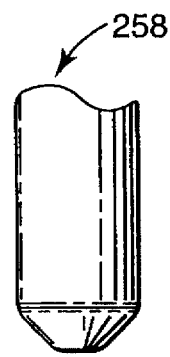

FIG. 15 is a side view of a known "V" punch 258 that can be used to make the article of the invention.

Figure 16:
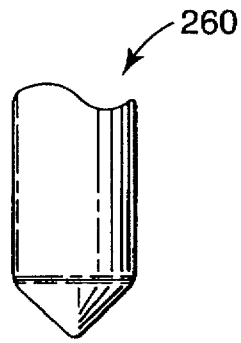

FIG. 16 is a side view of a known "V" punch 260 that can be used to make the article of the invention.

Figure 17:
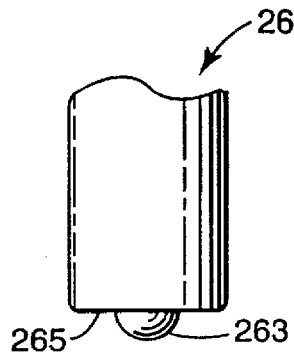

FIG. 17 is a side view of a known punch 262 having flat surface 265 and hemispherical protrusion 263 that can be used to make the article of the invention.

Figure 19:
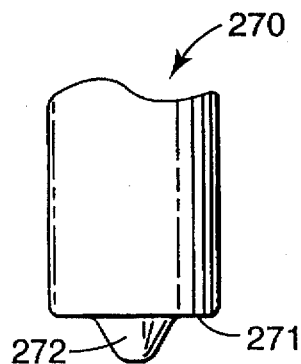

FIG. 19 is a side view of a known punch 270 having flat surface 271 and "V" or conical protrusion 272 that can be used to make the article of the invention.

Figure 22:
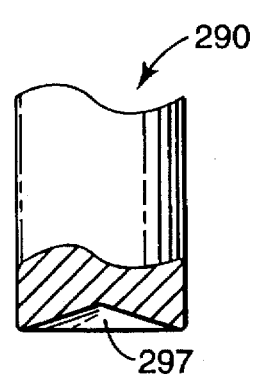

FIG. 22 is a side view of a known inverted "V" or inverted conical punch 290 having inverted conical feature 297 that can be used to make the article of the invention.

Figure 18:
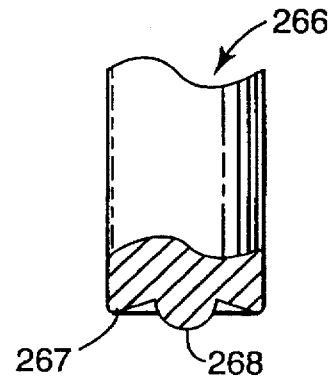

FIG. 18 is a side view of an angled gripping feature round punch 266 of the invention having hemispherical protrusion 268 and angled gripping feature 267 that can be used to make the article of the invention.

Figure 20:
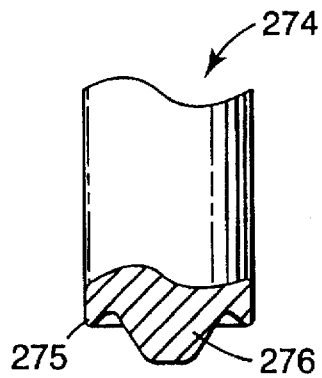

FIG. 20 is a side view of an angled gripping feature "V" punch 274 of the invention with a blunt nose "V" protrusion 276 and angled gripping feature 275 that can be used to make the article of the invention.

Figure 20A:
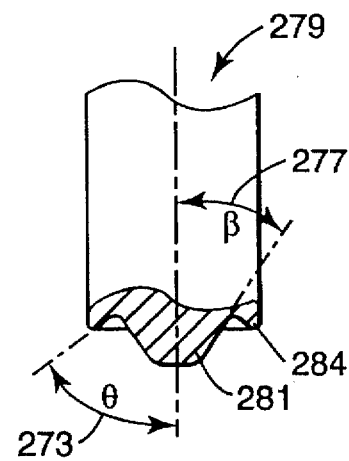

FIG. 20A is a side view of an angled gripping feature "V" punch 279 of the invention with a symmetrical blunt nose "V" protrusion 281 and angled gripping feature 284 that can be used to make the article of the invention. Also shown is angle θ 273 that is defined by the intersection of a first line tangent to a gripping feature surface and a second line passing through the center of symmetry of the protrusion but intersecting the first line at a point inside the protrusion and inside the punch tool, on a side of the punch tool having the end. Also shown is angle β 277 that is defined by the intersection of a first line tangent to a protrusion surface and a second line passing through the center of symmetry of the protrusion but intersecting the first line at a point outside the protrusion and outside the punch tool, on a side of the punch tool having the end.

Figure 21:
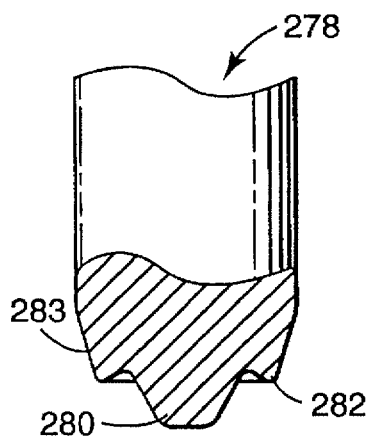

FIG. 21 is a side view of a strengthened gripping feature "V" punch 278 of the invention with a blunt nose "V" protrusion 280, angled gripping feature 282, and strengthened, tapered side 283 that can be used to make the article of the invention.

Figure 23:
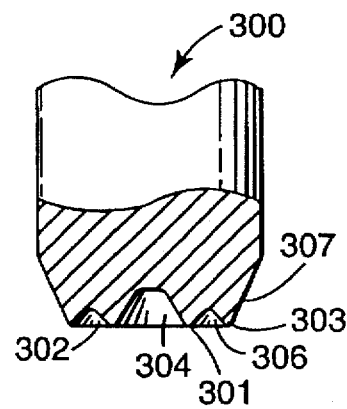

FIG. 23 is a side view of a strengthened angled gripping feature "V" punch 300 of the invention with recessed frustoconical area 304 and recessed conical areas 302 and 306 and strengthened, tapered side 307, and gripping feature 303 that can be used to make the article of the invention.

Figure 24:
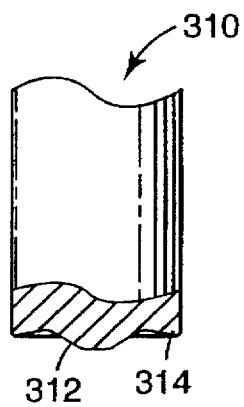

FIG. 24 is a side view of a gripping feature "V" punch 310 of the invention with frustoconical protrusion 312 and low angle gripping feature 314 that can be used to make the article of the invention.

Figure 25:
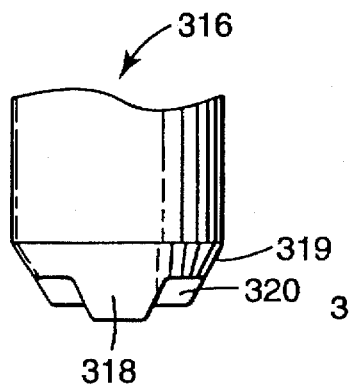

FIG. 25 is a side view of a strengthened gripping feature "V" punch 316 of the invention with blunt nose "V" protrusion 318, knuckle gripping extension 320 and strengthened, tapered side 319 that can be used to make the article of the invention.

Figure 26:
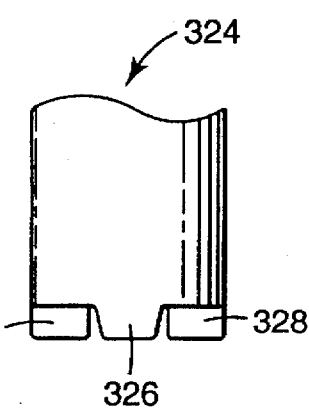

FIG. 26 is a side view of a flat punch 324 of the invention with slots and protrusions 326, 328, and 330 that can be used to make the article of the invention.

Figure 28:
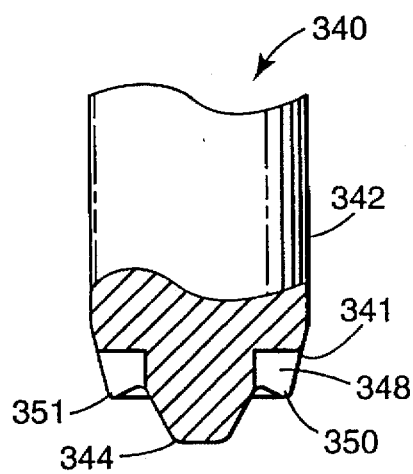
FIG. 28 is a partial cross-section of a punch taken along lines 28—28 of FIG. 27.

FIG. 28 is a side view of a strengthened, vented, angle-gripping feature "V" punch 340, of the invention with vent 348, gripping feature recess 350, "V" protrusion 344, strengthened sides 341, outer diameter of punch 342, gripping feature peak 351 that can be used to make articles of the invention.

Figure 27:
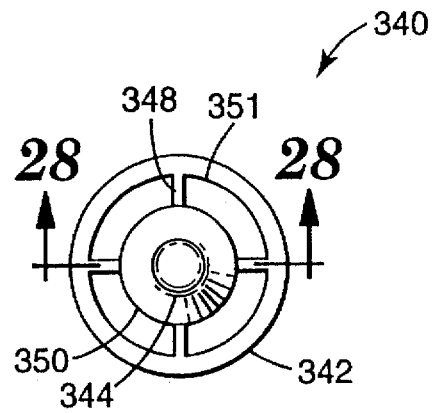
FIG. 27 is a bottom view of a punch.

FIG. 28 is the cross-section 28—28 of FIG. 27. FIG. 27 is the bottom view of the punch in FIG. 28.

Figure 28A:
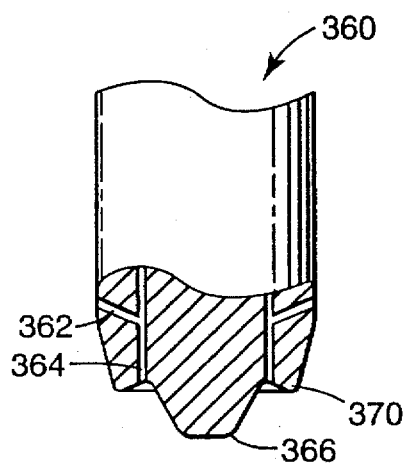
FIG. 28A is a second embodiment of a punch showing venting holes.

FIG. 28A is a side view of a strengthened, angled, gripping feature "V" punch 360 of the invention with vents 362 and 364, gripping feature 370 and "V" protrusion 366 that can be used to make articles of the invention.

FIG. 29 is a side view of an angled, gripping feature "V" punch 372 of the invention having recessed conical areas 376, gripping feature 374, "V" protrusion 375, extension shaft 378, and extension end 380 that can be used to make the article of the invention along with the extension end providing a pre- or post operation to the article in conjunction with the deformation design of the punch.

FIG. 30 is a side view of an angled, gripping feature "V" punch 386 of the invention having gripping feature 388, recessed conical areas 390, extension shaft 392, and extension end 394 and "V" protrusion 391 that can be used to make the article of the invention along with the extrusion end providing a pre- or post operation to the article in conjunction with the deformation design of the punch.

FIG. 31 is a side view of a punch 400 of the invention having hemispherical protrusion 402 and gripping surface 404 with many small gripping features that can be used to make articles of the invention.

FIG. 32 is a side view of an angled gripping feature "V" punch 410 of the invention having angled gripping feature 412, many smaller gripping features 414, and frustoconical protrusion 416 that can be used to make articles of the invention.

FIG. 33 is a side view of an embodiment of the article of the invention comprising upper substrate layer 420, lower substrate layer 424, vibration damping layer 422, hole 426, protrusion area 421, deformation 423, and deformation area 428.

FIG. 34 is a side view of an embodiment of an article of the invention having upper substrate 430, lower substrate 434, vibration damping layer 432, deformation 435, protrusion area 431, deformation area 500, and hole 433 in upper substrate 430.

FIG. 35 is a side view of an embodiment of an article of the invention having upper substrate layer 502, lower substrate layer 506, vibration damping layer 504, partially removed upper substrate plug 508, deformation 503, protrusion area 501, deformation area 510.

Figure 36:
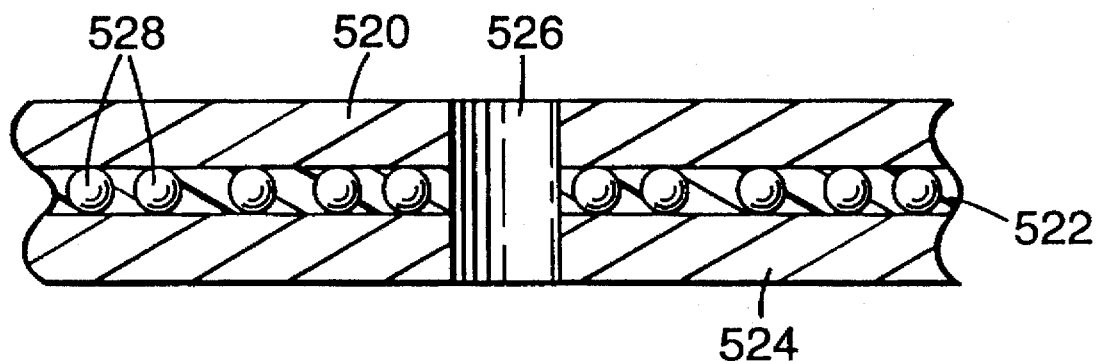
FIG. 36 is a partial cross-section of another laminate of the invention.

FIG. 36 is a partial cross-section of the laminate article of the invention comprising upper substrate layer 520, lower substrate layer 524, hole 526, vibration damping layer 522, damping layer bridging particles and/or fibers 528.

The punches useful according to the invention can be used to displace the vibration damping material and deform the substrate layer(s). Useful punches include known punches such as those in FIGS. 13–17 and 19 and 22. Preferred punches are those novel punches of the invention shown in FIGS. 18, 20–21, 23–32. Useful punches typically have an aspect of the tool that applies force in more than one direction to the laminate surface(s). For example, a first force is applied by the tool at an angle to the laminate surface and preferably at an angle towards the hole or attachment area of the intended deformation area. The gripping feature of the punch tool provides this first force. The force serves to push material to the hole (substrate and vibration damping material) and also can prevent the substrate layer from slipping away from the hole. A second force is applied in the hole area and is at an angle designed to apply the most force in the downward direction and outward from the hole. The protrusion of the punch tool provides this second force. The resultant of these two forces working together will concentrate the tool force in a manner to displace the vibration damping material mass and deform the substrate(s). The tool design is based on the substrate materials used, hole size (if any), thickness of the laminate, thickness of each layer in a laminate, vibration damping material used and layer types in the laminate. The preferred types of punches designed for vibration damping material displacement and substrate deformation to achieve optimum fastener force retention are those of the present invention. These punch configurations are not the full matrix of designs, but demonstrate the basic concepts in using a tool specifically designed for laminated article fastener device force retention optimization.

The punches of the invention may also have some unique requirements due to their design. For example, the punches may require "venting" or "slotting" to allow escape of fluids used in the stamping process that can be entrapped in cavities or pockets the punch may form between the punch end and the laminate during the tool's use. The entrapped fluid may not be highly compressible and can impede the punch deformation of the laminate if not allowed to escape when under pressure. In addition, the punches may require added strength designs to prevent the tool from cracking, flexing, or having premature wear during the stamping process. The added strength or support to the punch may be added by tapering the tool end to a wider shaft (tapering the shaft adjacent to the tool end) This will add strength to the gripping features near an edge of the tool. The punches may also require a higher grade or different grade of tool steel to enhance the tool life then may typically be used for other punch type processes on the laminate (for example, piercing, embossing or coining).

The text handbook of metal forming (McGraw-Hill, Inc. Lange, ISBN 0-07-036285-8) gives a good overview of stamping processes and equipment in general.

Thus the present invention relates to a laminate article with improved torque retention, a method of making the article and tools used to deform the substrate and displace the damping material. The laminate articles of the invention provide fastening systems having improved torque and/or force and/or pressure and/or stress retention. The present invention relates to a method of improving the torque and/or stress and/or force and/or pressure retention properties of a laminate structure by displacing the damping material in the laminate in the deformation area from an initial mass to a reduced mass that in turn reduces the torque lost in a retention device following attachment or assembly of the laminate into a structure with the attachment device. The method further provides for a deformation or featuring of the substrate layer(s) of the laminate to minimize the amount that the damping material can recover back into the location it had been forced from and also to minimize the force required to compress the substrate layers together due to a residual spring effect between substrate layer(s) and can allow reduced dynamic friction in some fastener devices.

The present invention provides a method of improving the force retention in damping material laminate attachment devices, and thereby solving a problem with force reduction in the fastener system due to the damping material stress relaxing after the device is attached plus the need to overcome the spring effect between laminate layers and in some designs reducing the attachment device and substrate dynamic friction.

More specifically, the present invention provides a laminate with the vibration damping material reduced from an initial mass in the deformation area to a lower mass, plus deform the substrate layer(s) to reduce the spring effect, damping material recovery and lower attachment device to substrate friction, to provide for a laminate with more fastener force retention after a given period of time and temperature as compared to a cover not using the invention.

The tools used to reduce the damping material mass are designed such that the force of the tool displaces the vibration damping material in the deformation area of the laminate article. The tool also plastically deforms the substrate layer(s) such that they reduce or inhibit the damping materials ability to recover to its original location in the laminate after the stamping operation. The substrate layer(s) are also plastically deformed such that they do not impart a resistive or spring force against the attachment device when applied (i.e., when the damping material is displaced if the laminate layer springs back to it's original location or recovers a percentage of the amount it was deformed, this "spring" will need to be overcome by the attachment device and this could reduce the overall torque retention).

The tool provides displacement of the vibration damping material mass to minimize stress relaxation in vibration damping material in the deformation area, plus useful deformation of the substrate layers to prevent vibration damping material recovery and substrate layer spring effect and reduction of attachment device to substrate application friction. Typically the laminate is modified such that the improvement in the force retention of the fastener device is at least about 5% improved in comparison to a laminate of the same construction and design, but not utilizing the invention. Preferred improvement is at least about a 20% increase, most preferred is at least about a 35% increase in the force retention of the attachment device in an attachment area at least partially contacting a deformation area as determined by the "Laminate Force Retention Test Method for Laminates configured with 'Through-Holes" described below.

Useful tool designs are those that provide at least about a 5% improvement in fastener device force and/or torque and/or pressure and/or stress retention. Useful tool designs which accomplish the vibration damping material displacement and plastic deformation of the substrate layers include but are not limited to those tools that have flat, round, bullet (such as pointed conical, etc.), "V" (conical) or flat with a protrusion style punch design. These tool designs should be such that the majority of the force is applied in the direction normal or perpendicular to the laminate surface. This can require a flat, flat with a protrusion, a round or a bullet punch to have a large radius as compared to the attachment area or hole and a "V" style punch with small angles to the horizontal of the laminate. Useful round, bullet, or flat style punches are those which have a radius (or equivalent over sizing for non-round holes) at least about 1.01 times greater than the hole or attachment area diameter, preferably at least about 1.5 times greater, and most preferably at least about 2 times greater than the hole diameter. The angle of the "V" style punch is typically from 1 degree to 89 degree as defined by the intersection of a first line tangent to the surface of the "V" protrusion and a second line parallel to a surface of the tool shaft and passing through the center of the "V" type protrusion preferably from 20–89 degrees, and most preferably from 30–89 degrees.

Preferred tool designs of the invention are those that include a gripping features and at least one protrusion. The tools will deform the laminate in at least 2 main directions. The direction of at least 2 of the forces generated by the punch tools working surfaces are at angles to each other and the resultant forces or tool effect generates a displacement of the vibration damping material mass and plastic deformation of at least one substrate layer. The deformation of the substrate layer(s) also preferably limits the residual spring effect of the substrates, reduces vibration damping material recovery and reduces dynamic friction losses during fastener device application. This tool design should achieve at least about a 5% increase in attachment device force and/or torque and/or pressure and/or stress retention and may achieve greater than about a 35% improvement in retention as compared to a laminate with no displacement of the vibration damping material and plastic deformation of the substrate layers. For a hole near the edge of the laminate attachment devices, the tool design is such that the protrusion contacts the inner edge of the hole and directs a portion of the laminate in an angled downward direction. The gripping feature(s) of the tool directs a portion of the laminate material in the area surrounding the hole in an angled (opposite the protrusion) direction. The resultant forces of this tool will concentrate the forces in a fashion to displace the vibration damping material, provide for substrate deformation to reduce vibration damping material recovery, reduce substrate spring effect and potentially reduce dynamic friction.

The punch tool's protrusions include but are not limited to those selected from the group consisting of frustoconical, elliptical, spherical, hemispherical, bullet-shaped, cylindrical, and conical protrusions and variations between these. The gripping features include but are not limited to those selected from the group consisting of a textured surface(s), continuous ridges, discontinuous ridges, continuous ridges having textured surfaces and discontinuous ridges having textured surfaces.

The tools used to displace the vibration damping material may also partially close or further open the hole during the deformation process. The hole diameter should be selected to take into account the tool design and the effect it has on the hole diameter so that the resultant article has its intended dimensions.

The preferred tool design includes a symmetrical protrusion and gripping feature on the end of the tool. The protrusion has at least one angle as defined by the intersection of a first line tangent to a surface of the protrusion and a second line passing through the center of symmetry of the protrusion but intersecting the first line at a point outside the protrusion and outside the punch tool, on a side of the punch tool having the end. The angle is between 0.5–89 degrees, preferably is from 20–89 degrees and most preferably from 30–89 degrees.

The gripping feature has at least one angle as defined by the intersection of a first line tangent to a surface of the gripping feature and a second line passing through the center of symmetry of the protrusion but intersecting said first line at a point inside the protrusion and inside the punch tool, on a side of the punch tool having the end. The angle is between 0.5–89 degrees, preferably is from 20–89 degrees and most preferably from 30–89 degrees. FIG. 20A is a cross-section showing an example of the angles, for a punch tool 279 having angle β 277 of the protrusion 281 and angle θ 273 of the gripping feature 284.

Furthermore, the tool is usefully designed such that the deformation of the laminate as caused by the gripping feature of the tool occurs as the protrusion part of the tool is also deforming the laminate. The tool should be designed to concentrate and build the mechanical forces on the damping material to cause the damping materials displacement and plastic deformation of the substrate.

FIG. 36 illustrates the second laminate of the invention which comprises an upper substrate layer 520, lower substrate layer 524, vibration damping layer 522, hole 526, and particles 528.

Laminate Force Retention Test Method for Laminates Configured with Through-holes The laminate force retention test measures the retained force of an attachment device after the device has been applied to the laminate in the desired test areas. The laminate has the test method attachment device applied and the assembly is allowed to set for a prescribed period of time and at a temperature and humidity range plus other environmental conditions of the article in it's end use worst case application or in a modified environment to the worst case condition.

A test to determine the benefit of the invention in an laminate article is conducted as follows:

1) Select the laminate to be tested.

2) Select a screw and associated sample base that has a tapped hole for the screw to be screwed into. The sample base and screw should be of the same base material as the end use application (ex: aluminum, stainless steel, etc.). The screw should be the same or equivalent as used in the end use application.

The default screw and base materials are aluminum. The default screw shaft should fit through the through hole in the laminate. The screw shaft diameter should be at least 20% of the hole area and the screw head sized to support the strength required to support the torque applied to it and to contact an area at least 5.0% the size of the hole, surrounding the hole.

for laminates without a hole in the attachment area, a through hole could be added to the attachment area that is 0.05–10 times the nominal thickness of the laminate in diameter. If the laminate has a deformation area, the hole should be centered in this area and be less than 95% of the deformation area. If a hole is not desired, a clamp verses a screw attachment device can be used to conduct the test. The clamp should have a contact area to the substrate of at least 25%. The clamp device is of a design with the force applied in a perpendicular extension to the laminate surface. The extension is a screw type extension so that a torque driver can be used to apply the clamp force.

Cut out from the laminate two samples by a method that does not effect the areas to be tested (by laser cutting, water jet cutting, shearing methods, etc.). The first sample is taken from the laminate in an attachment area. Cut out a sample that is at least 25% larger than the intended attachment area. The comparison samples should be taken from the laminate in an area that is not an attachment area, but has a laminate construction of the article with no substrate layer deformation.

The comparison sample should be of the same size as the sample taken from the laminate to test the attachment area. The comparison sample may have a hole pierced into it by a stamping method or by laser cutting of the same size hole as the invention sample (if not present). The area that the comparison sample is taken from the invention should be from an area that has the same input substrate and damping materials configuration prior to the laminate being process to an article.

4) Place the samples from the laminate (comparison sample and sample of the attachment area) into a controlled environment (temperature: humidity, etc.) that duplicates the environment that the laminate would be applied to the base with the desired attachment device. The default temperature and humidity is 65–75 F. and 30–70% relative humidity.

5) Apply the screw type or clamp type attachment device to the laminate samples (comparison sample and sample of the attachment area) and the test base to the prescribed end use application torque down force that duplicates the environment that the laminate would be applied into the end use base. The default temperature and humidity is 65–75 F. and 30–70% relative humidity. Use clean screws and clean surfaces for the test. (No oil or lubricants should be present on the surface) Torque down the screw to 100% +/−15% of the application torque force with a torque driver 6) Set the torque applied samples into an environment that duplicates the worst case force loss environment that the article will be subjected to during it's use after attachment. This is typically the highest temperature, highest humidity and worst case chemical environment that the article will be exposed to after the fastener device is attached. Apply these conditions for a period of 24 hours. The default temperature is 100° C. (212° F.), and 30–70% relative humidity for 24 hours.

7) After the 24 hour test period, place the samples back into an environment that duplicates the application environment used to apply the screw fastening device to the laminate samples and sample bases to bring the torque applied samples to the application temperature. The default temperature and humidity is 65°–75° F. and 30–70% relative humidity for 24 hours.

8) Measure the maximum torque force required to remove the screws or clamps from the laminate samples (comparison sample and sample of the fastener area) and compare the force measurements to compare the samples force retention.

Method of Making the Article:

The method of making the article of the present invention typically involves the displacement of the vibration damping material by means of a stamping process. The laminate is typically manufactured by incorporation of a vibration damping material as one or more interior layers of the laminate followed by the stamping process. The vibration damping material may be layered in between the substrate(s) layers e.g., stainless steel and its alloys, carbon steel, aluminum and its alloys, polyester, etc., of the vibration damping laminate article.

Preferably, the laminated material has the vibration damping material laminated, sprayed, silk screened, or cast onto one or more layers of structural material. The vibration damping material layer can be continuous, or discontinuous. The vibration damping material may substantially form a layer having about the same dimensions as the substrate layers between which it is sandwiched. Alternately, the layer may be of more limited dimensions and may be situated in an area of greatest vibrational stresses. Typically, an amount of the damping material is present such that the damping characteristics of the article are improved over a non-laminate or monolithic article. Preferably, a sufficient amount of the vibration damping material is used such that the damping is improved by at least about 10% in at least one vibrational mode.

The laminate article of the invention utilizes the displacement of the damping material, deformation of the substrate and benefit of the vibration damping materials with a minimum impact on the article's structural geometry and stiffness while providing improved fastener force retention upon application to provide a optimized damped laminate article. Thus, the articles of the present invention are good candidates for products that require vibration and shock resistance and control, reduced noise generation and transmission, along with improved force retention of the attachment device that is used to hold the laminate of the invention in place.

Those skilled in the art can select the best means to introduce the damping material and the damping material displacement and substrate deformation into a specific process based on the needs of the final laminate article of the invention and also limitations in processing capabilities of the laminate input materials.

The damping material can include a viscoelastic material or a combination of viscoelastic material with the optional previously mentioned fibrous and/or particulate material. It is to be understood that the vibration damping material can include a blend of viscoelastic materials as well as a variety of different fibrous or particulate materials. Blends of fibrous and particulate material are also possible.

The desired thickness of the damping material (in the laminate prior to preparing the article of the invention) is typically about 0.002 mm to about 1.5 mm; preferably, about 0.02 mm to about 1 mm; and most preferably, about 0.02 mm to about 0.25 mm. Typically, the thickness of the damping material is about 0.5 to about 50% of the thickness of the laminate, and more typically about 1 to about 25%. The article of the invention typically contains at least 1 damping layer, more typically 1–3 layers, preferably 1–2, most preferably 1 for reasons of simplicity of the article's manufacturing process and cost. Stiffness may also be sacrificed when more than 1 damping layer is included. However, a wider temperature range of damping is possible when multiple layers of different vibration damping materials are included. Sufficient damping material should be used to obtain the desired damping effect while balancing the structural requirements of the article. The vibration damping layer may be continuous or discontinuous. A continuous layer may comprise the same material or adjacent sections of different vibration damping materials or spaces or substrate material. A discontinuous layer may comprise sections of damping material separated by non-damping material and/or spaces. When 2 or more layers are present the layers may comprise the same or different damping material and each may be continuous or discontinuous.

The laminate article of the invention having improved fastener force and/or stress and/or torque and/or pressure retention can be made by any suitable technique for creating articles as understood by those in the industry the article is being used. For example, a cover for a disk drive application can be made by adding a single layer of a vibration damping material 0.05 mm thick near the center of the cover by laminating a layer of stainless steel with a layer of suitable viscoelastic damping material and an additional layer of stainless steel. This laminate is then stamped with various tools and dies that provide the needed part definition (embossing, blanking, forming, coining, etc.) as discussed in the stamping reference. The final laminated cover during this stamping process has holes pierced in it to provides a path for the fastener devices (screws) to hold the cover securely to the base (and to other components, such as an acuator and spindle motor, if desired). The fastener areas are further modified either before or after piercing with a tool punch of the invention to displace the vibration damping material, impart a deformation into the stainless steel to reduce the vibration damping material's recovery and minimize residual spring effect between the stainless steel layers and to feature the attachment area such that dynamic friction is reduced, to provide a laminated disk drive cover with improved force and/or torque and/or pressure retention in the fastening system as compared to laminated covers not modified for improved fastener force retention.

Examples of laminated articles which may be produced with improved force and/or torque and/or pressure retention characteristics include but are not limited to those selected from the group consisting of covers, panels, housings, baffles, pans, containers, and ducts and other applications where conventional methods to improve the force retention of the fastener system in a laminated article are not practical, cost effective, sufficiently effective to meet design goals or are limited by initial force that can be used to apply the fastener system. Example of specific articles include but are not limited to those selected from the group consisting of vehicle oil pan covers, disk drive covers, vehicle valve covers, appliance panels, vehicle panels, acoustical panels, laminated sheeting panels, building panels, aerospace panels, heating panels, ventilation panels, air conditioning panels, motor housings, appliance housing, equipment housings, fluid baffles, acoustical baffles, vehicle oil pans, shipping containers, holding containers, storage containers, transportation containers, heating ducts, ventilation ducts, air conditioning ducts and cooling ducts.

EXAMPLES

The invention has been described with reference to various specific and preferred embodiments and will be further described by reference to the following detailed Examples. It is understood, however, that there are many extensions, variations, and modifications on the basic theme of the present invention beyond that shown in the examples and detailed description, which are within the spirit and scope of the present invention. All parts, percentages, ratios, etc. in the Specification and the Examples are by weight unless indicated otherwise.

Examples 1–2 and Comparative Example 1

In order to evaluate the performance of a damped laminate with improved fastener force retention, a sample article was prepared by adding a layer of a 0.051 mm damping material in a construction that had exterior layers of stainless steel at 0.030 inches and 0.037 inches (0.76 mm and 0.94 mm, respectively). The laminate construction was then processed in a tool to add pierced holes, embossing and the displacement of the damping material and deformation of the stainless steel layers in the deformation areas. (Examples 1 and 2). Two style of punches were used for these Examples.

The constructions of Examples 1 and 2 were compared to a similar article made in the same tooling and process except without the displacement of the damping material and deformation of the stainless steel layers in the deformation areas, thereby not improving the force retention of the Comparative Example.

DESCRIPTION OF SAMPLE

For the purpose of demonstrating the invention, an acrylic damping material was used in the damped laminate article. The damping material used was an acrylic polymer that had a loss factor greater than 0.5 for a broad frequency range (+/−1000 Hz) at the desired test temperature (20° C./72° F.). The acrylic damping polymer selected was 3M Scotchdamp™ ISD-112, SJ2015 type 1202 available from Minnesota Mining and Manufacturing Company, St. Paul, Minn.). The damping material was placed as an inner layer of a stainless steel damped laminate construction. This laminate construction was then processed through a stamping operation to produce a completed damped laminate article as described below.

Examples 1 and 2

A 0.051 mm thick sheet of acrylic polymer damping material (3M Scotchdamp™ ISD-112) was placed (laminated) between layers of stainless steel [one 0.030 inch (0.76 mm) and the other 0.037 inch, (0.94 mm thick)]. The damping material was laminated onto the initial stainless steel layer and the second stainless steel layer was added onto the damping material to create a laminate construction. The damping material selected had room temperature pressure sensitive bonding characteristics, so no heat and only modest pressure with a rubber roller was required to create the laminate material. The damped laminate material was then processed through several stamping operations to form a completed article, a disk drive damped laminate cover.

The laminate input material was initially put into a mechanical press that can apply significant pressure to the laminate material as it is positioned between a die and punch set-up. Press tonnage was typically 50 tons ($4.54 \times 10^4$ kg) or more. The die and punch set-up are designed as to impart a particular feature into the laminate material. The basic process steps for the damped laminate cover of the Examples 1 and 2 included operations to emboss the cover (displace the laminate material to 2 or more horizontal levels), pierce the cover to add holes for screws, and the final blanking or cutting out of the part from the excess laminate material.

An additional process was added for these covers before the blanking process. This added process was to add a stamping step where the damping material was displaced and the stainless steel substrate plastically deformed in the screw hole attachment area. This process was added to improve the torque retention of the screw fastening system.

Example 1 used a tool of a configuration as found in FIG. 19. Example 2 used a tool of a configuration as found in FIG. 24. The tool types shown were used to modify the pierced hole to displace the damping material and plastically deform the stainless steel layer. For the tools used in the examples, the tools were centered on the pierced holes and applied in such a manner (press stroke and tonnage) that the laminate was deformed and the damping material displaced. The degree of deformation of the substrate and displacement of the damping material was indicated by the degree of hole area reduction (the tools used can reduce the hole diameter or size depending on the deformation desired) and as indicated by the depth of the gripping feature or flat into the stainless steel layer and penetration of the protrusion against the inner portion of the through holes. For the Examples 1 and 2, the hole reduction was targeted at between 82–90% of the initial hole size and a depth of between 0.001 and 0.004 inch (0.025 and 0.100 mm). For the gripping feature or flat into the stainless steel surface. The acrylic polymer sheet completely covered the inner surface of each cover article.

The through holes were 0.132–0.141 inches (3.35–3.58 mm) in diameter. The deformation area extended 0.030–0.100 inches (0.76–2.5 mm) around the through holes. The attachment screws were aluminum with a shaft diameter of 0.114–0.118 inches (2.9–3 mm) and a head diameter of 0.216–0.224 inches (5.5–5.7 mm). The base was aluminum.

Comparative Example 1

Comparative Example 1 was prepared according to the procedure of Example 1 and 2 except that the process to displace the damping material and plastically deform the stainless steel layers was not used in the screw attachment area.

Test Method and Set-up:

The disk covers of Examples 1 and 2 and the Comparative Example 1 were all tested in the same test set-up and method.

The covers were tested as follows:

1) The disk drive cover is one of many parts of a disk drive. The cover fits onto a base or housing that the other components of the disk drive are set into. The cover has eight pierced holes, of which six are found on the outer edges of the cover. One hole is present at each of the four corners of the roughly 4 inches×6 inches (10 cm×15 cm) metric cover. The other two holes are found near the edge of the mid-point of the long side of the cover. The covers six holes are in alignment with tapped holes in the base of the disk drive. Screws are used to hold the cover securely to the base. See FIGS. 1 and 2 for schematic details of the base housing and laminate cover. The screws are fit through the laminate covers pierced holes and into the base's tapped holes. The screws are torqued to 9 in./lbs. (10 cm/kg) to apply a holding pressure between the screw head and cover which in turn holds the cover securely to the base.

2) The fastener device used was an aluminum screw. The screws were placed in each of the outer holes of the cover and lightly tightened.

3) The screws were then tightened to 9 in/lbs (10 cm/kg) using a SEEKONK Precision Tools inch/pounds torque driver.

4) The laminate cover and base assembly following torquing was allowed to sit at room temperature (70° F., 21° C.) for 24±1 hours to allow the relaxation of the fastening device and laminate to occur.

5) After the relaxation time is complete, the force to undo the screw was measured by using the torque driver in the opposite direction. The torque driver has a dial indicator that shows the amount of torque being applied to the screw in the opposite direction of initial torquing. The screw torque driver will have a maximum value of torque required to remove the screw from the assembly. The "break" or maximum force required to begin turning the screw to remove it is recorded and the data is used to assess the benefit of the invention as compared to a cover without the invention.

The data is compared for each laminate cover design based on the average of the six holes tested in each cover design.

The average torque out data for each cover design (6 holes each) is found in Table 1. The data below is the average for 4 covers tested in each construction.

TABLE 1

| Example No. | Torque out cm-kg (in-lbs) | Normalized to initial torque value (9.0 in-lbs., 10 cm-kg.) % retention) And also in comparison to Comparative Example 1 |
| --- | --- | --- |
| Ex. 1 | 8.5 (7.4) | 82.2% +34.5% |
| Ex. 2 | 8.8 (7.6) | 84.4% +38.3% |
| Comp. Ex. 1 | 6.35 (5.5) | 61.1% — |

From the data in Table 1, it can be seen that the displacement of the damping material and the plastic deformation of the stainless steel layer significantly improved the average torque out retention value as compared to a cover with no modification.

The foregoing detailed description and Examples have been given for clarity of understanding only. No unnecessary limitations are to be understood therefrom. The invention is not limited to the exact details shown and described, for variations obvious to one skilled in the art will be included within the invention defined by the claims.

What is claimed is:

1. A laminate article comprising:
    a first substrate layer and a second substrate layer:
    at least one layer of vibration damping material comprising a viscoelastic material positioned between said first and second substrate layers;
    optionally one or more additional substrate layers positioned between said first and second substrate layers;
    optionally 1 or more bonding material layers bonded between a substrate layer and a vibration damping layer, wherein the storage modulus of each bonding material layer is higher than the storage modulus of the viscoelastic material contained in a vibration damping layer to which it is bonded;
    wherein the storage modulus of each substrate layer is greater than that of the viscoelastic material in any vibration damping material layer with which it is in contact;
    wherein at least one deformation area is present in said article, wherein a deformation area is an area of the article wherein at least one substrate layer is plastically deformed such that at least two substrate layers are touching or positioned closer to each other than in an area of the article in which none of the substrates are plastically deformed;
    wherein in at least 1 vibration damping material layer, within at least a 5% area of the deformation area, the vibration damping material is non-existent or, if present, has a mass that is 90% or less than the average mass of the vibration damping material layer of an equal area in an area of the article which is not in a deformation area;

wherein at least one substrate has a variable thickness in a deformation area; and wherein at least one of the first and second substrates contains protrusion(s) and/or depression(s) in a deformation area.

2. The laminate article of claim 1 wherein at least one hole is present in a substrate layer, wherein at least one hole is surrounded by a deformation area.

3. The laminate article of claim 1 wherein at least one hole is present in a substrate selected from the group consisting of the first substrate layer and the second substrate layer, wherein at least one hole is surrounded by a deformation area.

4. The laminate article of claim 1 wherein at least one through hole is at least partially present in the article, wherein at least one hole is surrounded by a deformation area.

5. The article of claim 1 wherein at least one substrate layer selected from the group consisting of the first and second substrate layers has at least one protrusion in at least one deformation area.

6. The article of claim 1 wherein the substrate layers are selected from the group consisting of metals and plastics.

7. The article of claim 1 wherein the substrate layers are selected from the group consisting of stainless steel, aluminum, copper, carbon steel, lead, polyethylenes, polyolefins, polycarbonates, polyesters, polyimides, polystyrenes, polyacetates, and vinyl copolymers.

8. The article of claim 1 wherein the bonding material layer is selected from the group consisting of epoxy resins and cyanoacrylates, polyamides, acrylics, phenoxies, and phenolics.

9. The article of claim 4 wherein each through hole has a diameter of about 0.01 to about 100 centimeters.

10. The laminate article of claim 1 having at least one layer of vibration damping material contained therein, said vibration damping material comprising a viscoelastic material, said vibration damping material having a loss factor of at least about 0.01 and a storage modulus of at least about $6.9 \times 10^3$ Pascals.

11. The article of claim 1 wherein the vibration damping material is a viscoelastic material selected from the group consisting of thermoplastic polymers, thermosetting polymers, and mixtures thereof.

12. The article of claim 11 wherein the thermosetting polymer is an acrylate.

13. The article of claim 1 selected from the group consisting of covers, panels, casings, housings, baffles, pans, containers, and ducts.

14. The article of claim 1 selected from the group consisting of vehicle oil pan covers, disk drive covers, engine covers, vehicle valve covers, appliance panels, vehicle panels, acoustical panels, laminated sheeting panels, building panels, aerospace panels, heating panels, ventilation panels, air conditioning panels, motor housings, appliance housing, equipment housings, fluid baffles, acoustical baffles, vehicle oil pans, shipping containers, holding containers, storage containers, transportation containers, heating ducts, ventilation ducts, air conditioning ducts and cooling ducts.

15. The article of claim 1 wherein said article contains at least two layers of vibration damping material and at least three substrate layers.

16. The article of claim 1 wherein at least one vibration damping material layer further comprises an additive selected from the group consisting of fibers, particulates, and mixtures thereof;

wherein the total amount of additive is about 1 to about 90 weight percent based upon the total weight of the vibration damping material;

wherein the particulate size ranges from about 0.02 to about 125% of the average thickness of the vibration damping material layer, in which the particulate is present, and in an area which is not a deformation area; and wherein the fiber diameter ranges from about 0.02 to about 125% of the average thickness of the vibration damping layer, in which the fiber is present, in an area which is not a deformation area.

17. The article of claim 1 wherein at least one vibration damping material layer further comprises an additive selected from the group consisting of fibers, particulates, and mixtures thereof;

wherein the total amount of additive is about 20 to about 90 weight percent based upon the total weight of the vibration damping material;

wherein the particulate size ranges from about 10 to about 125% of the average thickness of the vibration damping material layer in which the particulate is present in an area which is not a deformation area; and wherein the fiber diameter ranges from about 10 to about 125% of the average thickness of the vibration damping layer in which the fiber is present, in an area which is not a deformation area.

18. The article of claim 1 wherein the vibration damping is improved by at least about 10% in at least 1 vibrational mode.

19. The article of claim 1 wherein the vibration damping layer is a continuous layer.

20. The article of claim 1 wherein the vibration damping layer is a continuous layer made up of adjacent sections of different vibration damping materials.

21. The article of claim 1 wherein the article contains at least 2 layers of vibration damping material, wherein at least 2 of the layers comprise different damping materials.

22. The article of claim 1 wherein the vibration damping layer is a discontinuous layer.

23. The article of claim 22 wherein the discontinuous layer comprises sections of damping material separated by non-damping material or spaces.

24. The article of claim 1 wherein the vibration damping material layer within at least a 5% area of the deformation area, is nonexistent or, if present, has a mass that is 50% or less than the average mass of the vibration damping material layer in an equal area of the article which is not a deformation area.

25. The article of claim 1 wherein the vibration damping material layer within at least a 5% area of the deformation area is nonexistent or, if present, has a mass that is about 10% or less than the average mass of the vibration damping material layer in an equal area of the article which is not a deformation area.

26. The article of claim 1 wherein the vibration damping material layer within at least a 5% area of the deformation area is nonexistent or, if present, has a mass that is about 2% or less than the average mass of the vibration damping material layer in an equal area of the article which is not a deformation area.

27. The article of claim 4 wherein the area of each deformation area surrounding at least one hole is about 0.05 to about 100 times the area of each hole.

28. The article of claim 4 wherein the area of each deformation area surrounding at least one hole is about 0.05 to about 10 times the area of each hole.

29. The article of claim 1 having at least one integral attachment device projecting therefrom.

30. The article of claim 29 wherein said integral attachment device(s) projects from the first substrate layer, the second substrate layer, or both the first and second substrate layers.

31. A fastening assembly comprising the article of claim 1 and at least one attachment device positioned thereon.

32. A fastening assembly comprising the article of claim 1 and at least one attachment device positioned thereon, wherein at least one attachment device at least partially contacts at least one deformation area of the article.

33. The fastening assembly of claim 31 wherein the attachment device is selected from the group consisting of screws, bolts, clamps, nails and rivets.

34. A fastening assembly comprising the article of claim 1 and at least one attachment device positioned thereon, wherein at least one attachment device at least partially contacts at least one deformation area of the article.

35. A fastening assembly comprising the article of claim 24 and at least one attachment device positioned thereon, wherein at least one attachment device at least partially contacts at least one deformation area of the article.

36. A fastening assembly comprising the article of claim 25 and at least one attachment device positioned thereon, wherein at least one attachment device at least partially contacts at least one deformation area of the article.

37. A fastening assembly comprising the article of claim 26 and at least one attachment device positioned thereon, wherein at least one attachment device at least partially contacts at least one deformation area of the article.

38. A fastened assembly comprising the article of claim 1 fastened to a second article via an attachment device, wherein at least one attachment device at least partially contacts at least one deformation area of the article.

39. The article of claim 1 wherein at least 1 vibration damping layer is thermally conductive, electrically conductive, or thermally and electrically conductive.

40. The article of claim 1 wherein at least one vibration damping material layer has a thickness of about 0.002 mm to about 1.5 mm prior to the formation of at least one deformation area.

41. The article of claim 1 wherein the protrusion is a ledge.

42. The article of claim 1 wherein the depression is a notch.

* * * * *